US006859528B1

(12) United States Patent
Welte

(10) Patent No.: US 6,859,528 B1
(45) Date of Patent: Feb. 22, 2005

(54) TELEPHONE CALL BLOCKING SYSTEM

(76) Inventor: Gregory A. Welte, 806 N. County Rd. 700 West, Frankfort, IN (US) 46041

( * ) Notice: Subject to any disclaimer, the term of this patent is extended or adjusted under 35 U.S.C. 154(b) by 521 days.

(21) Appl. No.: 09/643,529

(22) Filed: Aug. 22, 2000

(51) Int. Cl.[7] .......................... H04M 3/42; H04M 1/00; H04M 3/00
(52) U.S. Cl. .............................. 379/210.02; 379/373.01
(58) Field of Search ...................... 379/210.02, 211.01, 379/211.02, 142.05, 142.06, 199, 188, 207.11, 207.13, 207.16, 373.01, 373.02

(56) References Cited

U.S. PATENT DOCUMENTS

| 5,446,785 A | * | 8/1995 | Hirai | 379/142.17 |
| 5,604,791 A | * | 2/1997 | Lee | 379/88.21 |
| 5,828,742 A | * | 10/1998 | Khalid et al. | 379/199 |

\* cited by examiner

*Primary Examiner*—Benny Tieu

(57) ABSTRACT

An accessory for association with a telephone answering machine, which blocks unwanted telephone calls. The "ringer" of the answering machine is de-activated: an incoming "ring" signal causes no "ring" sound. But the answering machine still answers, and may, or may not, say "Enter your password now." In either case, the caller knows that a password is required, and enters it, using the keypad on the caller's telephone. The accessory "listens" to the password. If it is correct, the accessory actuates its own acoustic ringer, notifying the owner that a password-holder is calling. The owner, if present, may answer the call. If the password is incorrect, no "ring" sound is generated, but the caller may leave a message on the machine, as usual. Thus, only password-holders can cause a "ring" sound, but no callers are blocked from leaving messages.

19 Claims, 17 Drawing Sheets

ANSWERING MACHINE
CONTINUES MESSAGE

OWNER LIFTS RECEIVER

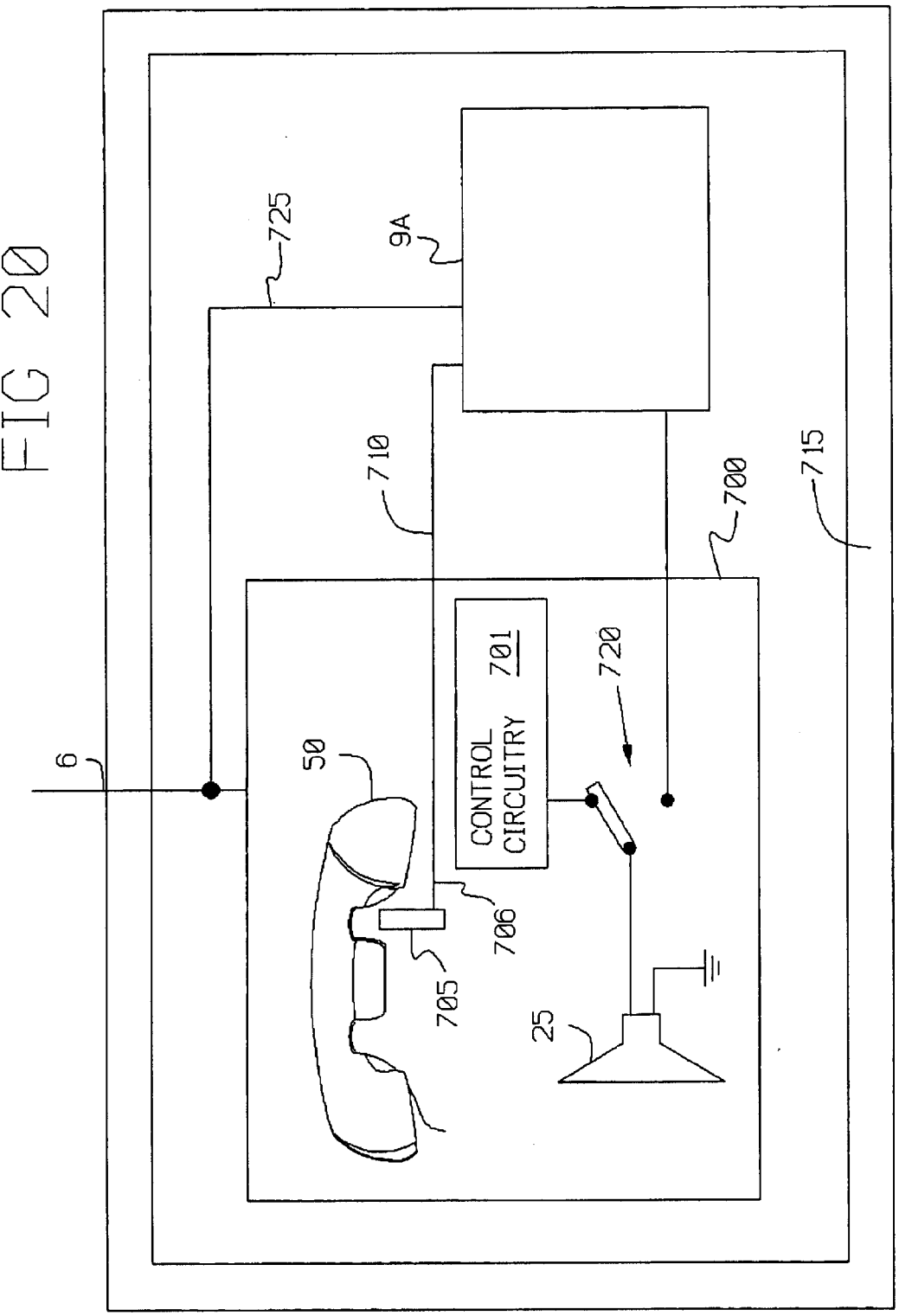

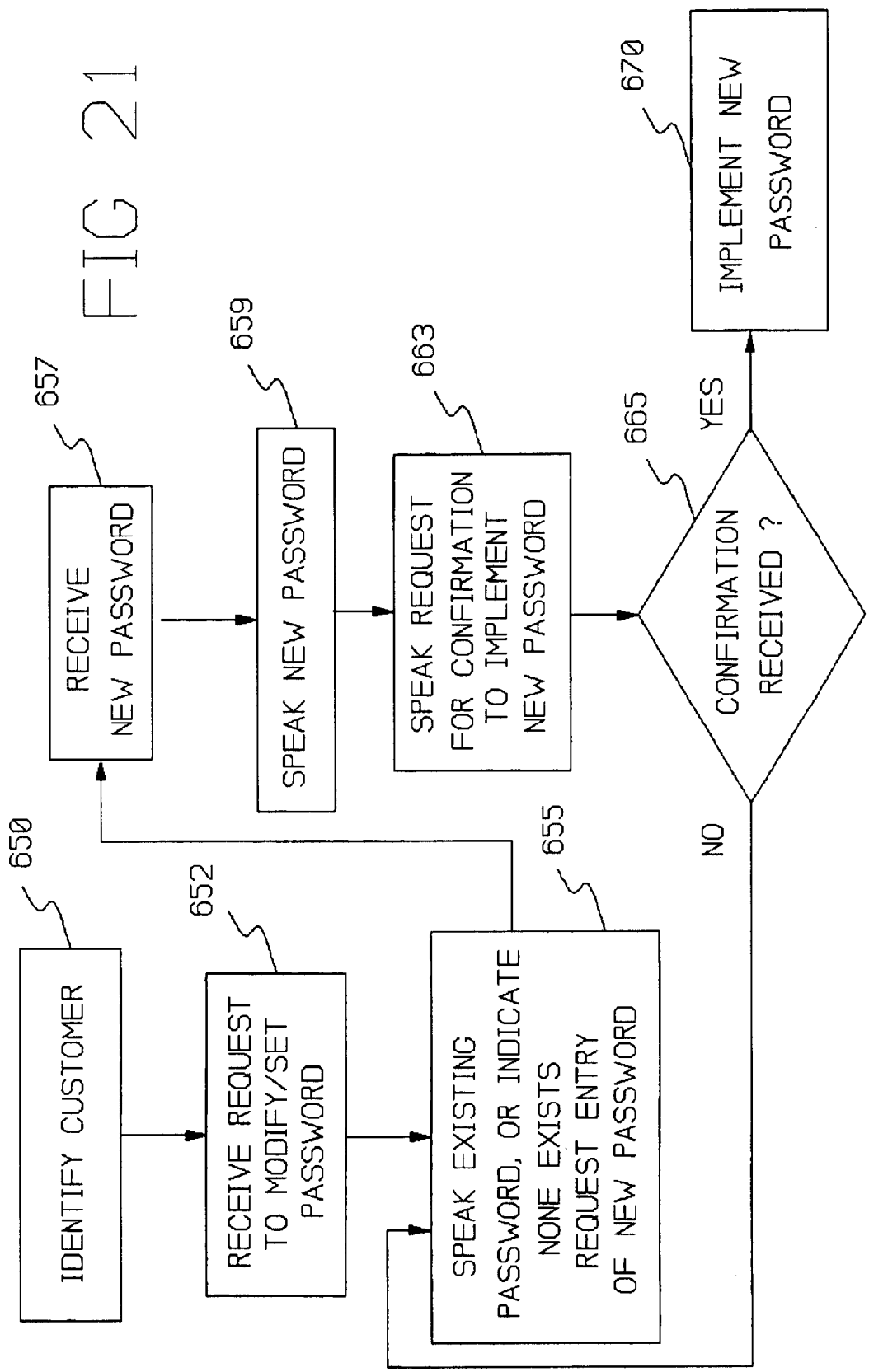

TELEPHONE CALL BLOCKING SYSTEM

The invention blocks incoming telephone calls if the caller lacks the proper password, but still allows callers lacking the password to leave telephone messages, so that no important messages are lost.

BACKGROUND OF THE INVENTION

Telephone solicitations are a nuisance. To reduce the nuisance, telephone companies provide services, such as selective-call-acceptance and selective-call-blocking. However, these services require the telephone subscriber to provide a list of telephone numbers to be accepted, or blocked.

Sometimes the list can be amended later, and sometimes the amending process is simple, because automated. For example, after an unwanted call is received, some telephone companies allow the subscriber to press a specific set of keys on the telephone, to add the caller's telephone number to the list of forbidden numbers. A similar procedure can apply to adding a caller's number to a list of acceptable numbers.

Despite the ease of amending the lists, the requirement of providing a list initially is seen as a deterrent to using these services. Two primary reasons are (1) the effort required to generate the list and (2) the fear of omitting important telephone numbers from the lists. As to reason (2), in the case of selective-call-acceptance, the fear is omitting an important person, such as a forgotten relative. In the case of selective-call-rejection, the fear is not knowing all the telephone numbers which should be rejected.

Further, even if the list(s) are generated, and the services implemented, these services do not necessarily provide complete protection. If they rely on "caller ID" information to block a call, then callers can block that identification, or use different telephone numbers at different times, and defeat the call blocking.

OBJECTS OF THE INVENTION

An object of the invention is to provide an improved system to block unwanted telephone calls.

SUMMARY OF THE INVENTION

In one form of the invention, if a caller fails to present a proper password, the invention refuses to allow a ring sound to be generated at the called party's location.

BRIEF DESCRIPTION OF THE DRAWINGS

FIGS. 18–20 illustrates three forms of the invention.

FIG. 21 is a flow chart illustrating procedures undertaken by one form of the invention.

DETAILED DESCRIPTION OF THE INVENTION

Overview

Figure 1:
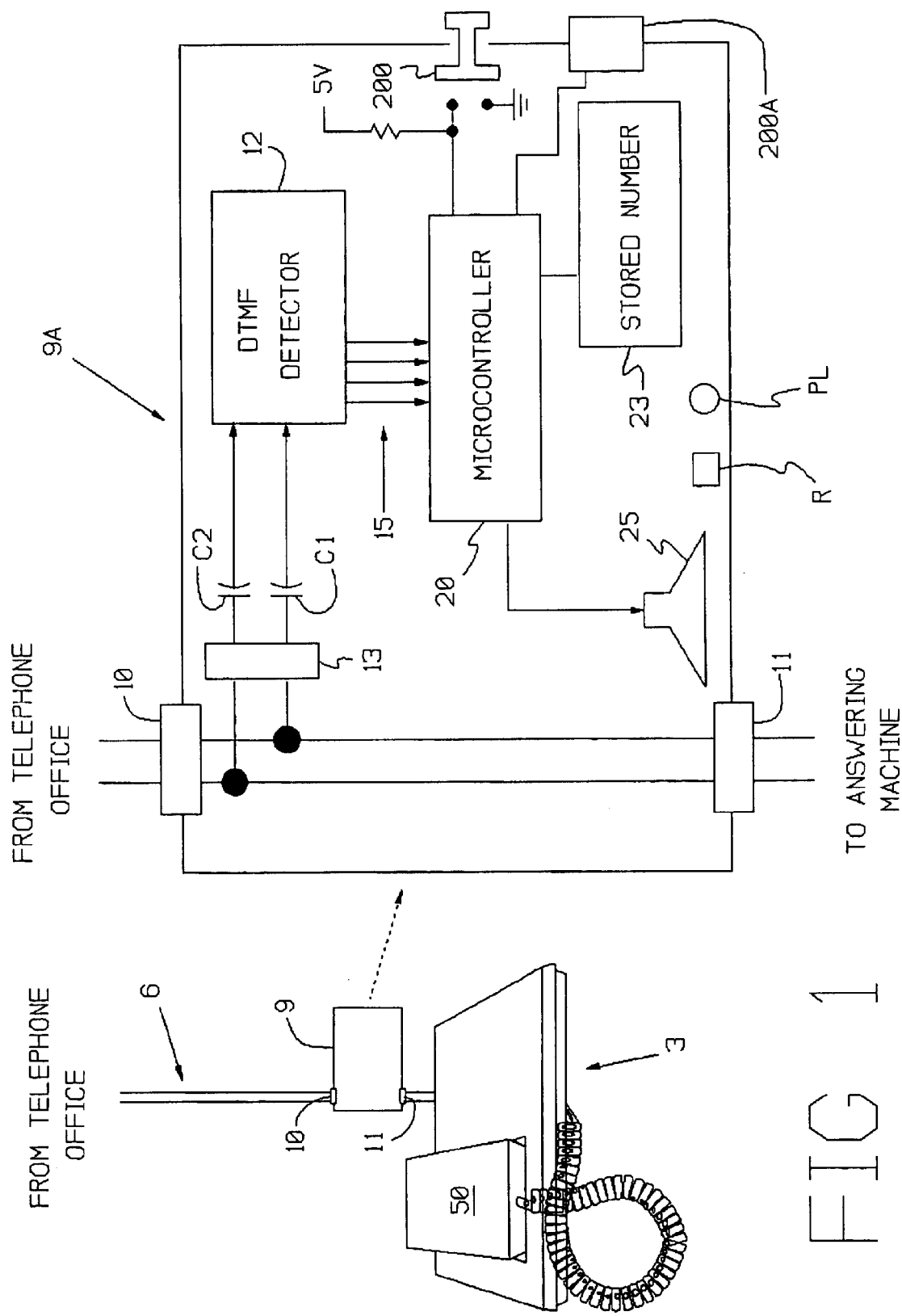
FIGS. 1 and 1A illustrate one form of the invention.
Figure 1A:
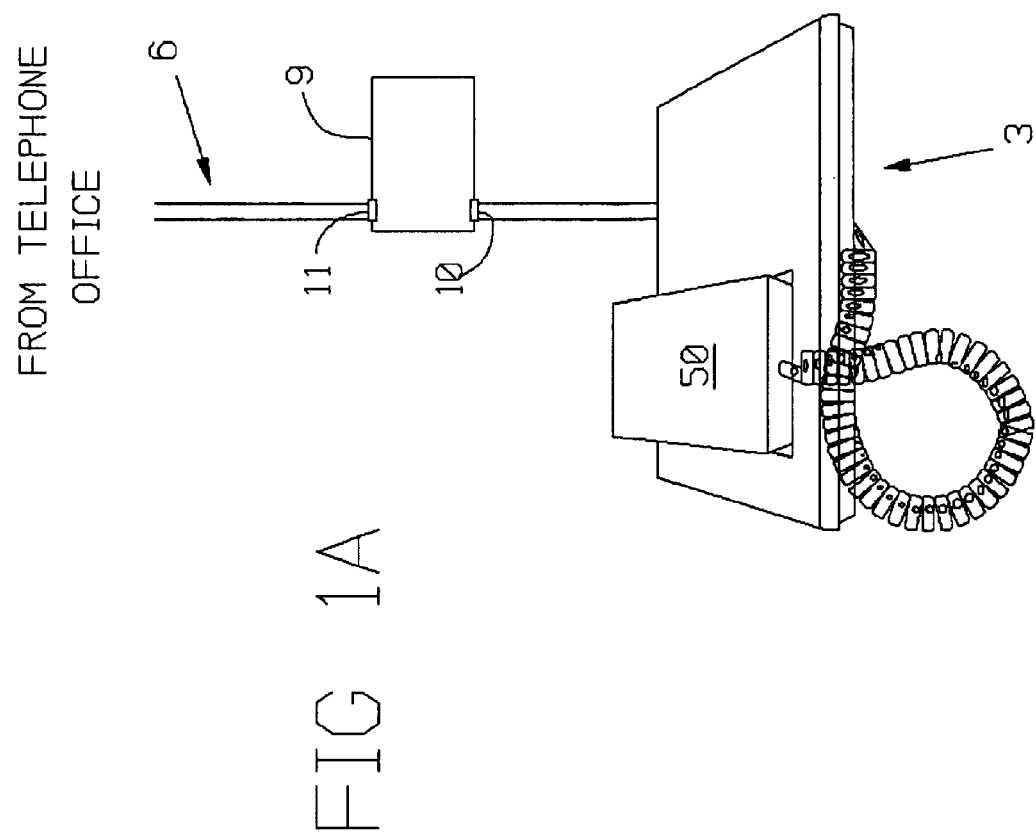

FIG. 1 illustrates one form of the invention 9. The invention is an accessory to an ordinary telephone answering machine 3. The owner of the accesory 9 attaches the invention to the telephone line 6 of the answering machine 3, and then (1) places the answering machine 3 into non-ringing mode, and (2) turns off the machine's loudspeaker. With these de-activations in place, the answering machine 3 remains silent at all times.

When an incoming call arrives, the answering machine 3 goes "off-hook" in the usual manner. At that time, the answering machine plays a recorded greeting, such as "Enter your password now." If the caller is equipped with a password, the caller enters it.

The accessory 9 "listens" to the password. If the password is correct, the accessory 9 issues a ringing sound through its own annunciator, thereby announcing the arrival of the incoming call. But the answering machine's own bell does not ring. In response to the ringing sound, the owner may answer the call, in the usual manner, by lifting handset 50.

If the password is not correct, the accesory 9 takes no action. No ringing sound occurs, and the answering machine 3 accepts, and records, a message in the usual manner.

To repeat, the accessory 9 does the following:

1. It stores a password.
2. It "listens" to telephone line 6 for DTMF codes.
3. If it "hears" DTMF codes which match the password, it issues its own ring, or bell, sound.
4. If it fails to "hear" the password, it remains silent.

Numerous different types of electronic circuits, both digital and analog, and other apparatus, can execute the four actions just described. Several types are described herein. In one form of the invention, these are the only functions performed by accessory 9.

While this operation may appear simple, it provides the following significant features. One feature lies in the mechanism used to issue the prompt for the caller to enter a password: that mechanism resides physically within answering machine 3. The pre-existing speech-producing apparatus contained within the answering machine 3, which is used to play greetings to callers, is also used to issue the prompt for entry of the password. The accessory 9 does not issue the prompt; it merely listens to the password, if entered, and responds.

It should be noted that the caller, or the answering machine 3 may issue the password. In either case, the password is present on line 6, and the accessory 9 will detect it. This feature is useful for testing.

A second feature lies in a potential variation of the procedure described above. The prompt, "Enter your password," may tempt unauthorized persons to guess the correct password, by randomly punching the keypad on their own telephones. To thwart this, the prompt may intentionally mislead callers, as by saying "Enter your password, followed by two 'pound' signs."

The suggestion of two pound signs acts as mis-direction, and misleads the caller. The reason is that whenever the invention receives two 'pound' signs, it automatically concludes that the caller is a hacker. Authorized callers are informed, in advance, that the request for two pound signs should be ignored.

A third feature lies in another potential variation. As just discussed, the prompt may tempt callers to guess the password. To eliminate the temptation, the invention allows the prompt to be eliminated. The answering machine plays its normal greeting, in the usual manner. Callers are given passwords, with advance instructions to enter the passwords while the greeting plays.

For example, the answering machine accepts an incoming call in the usual manner. It plays a greeting such as, "This is Jim McAtee. I am not available now. Please leave a message." The caller of Jim McAtee knows, in advance, that he/she should enter the password during that greeting, and that no prompt to enter the password will be given. Consequently, the caller enters the password during the greeting. The greeting may leave a period of silence for entry of the password. If the password is correct, the invention issues a ring sound.

Four ramifications of the third feature are these: (1) the subscriber's answering machine does not ring, so the subscriber is not disturbed; (2) unauthorized callers are not aware that a password is required; and (3) a ring sound will only be issued by the accessory 9 if the caller enters the correct password. This combination leads to (4): the unauthorized callers have been screened, but they do not know it. They believe that they have merely reached an ordinary answering machine.

Consequently, if an unauthorized caller is actually an acceptable caller, such as a party delivering an offer of employment, no offense is given to the party, as by being informed that the party's call is blocked. The caller only knows that the caller reached an answering machine, which is a commonplace, non-insulting occurrence.

In addition, since the accessory 9 "listens" to the telephone line, it can detect the password, no matter when entered. Consequently, a caller may listen to the greeting issued by the answering machine, and then begin to speak a message for recording by the answering machine. After beginning that message, the caller may remember that a password is required, or remember the password itself, if previously forgotten. The caller can interrupt his own message, and enter the password. The accessory will detect the password, and, if proper, issue a ring signal.

A fourth feature is that no modification of the answering machine is required, with the possible alteration of the machine's greeting. That modification is optional, as explained above, and is not an actual modification to the permanent structure of the answering machine, although it may modify the contents of memory.

A fifth feature is that the owner of the invention need not worry about forgetting to give the password to callers. If a caller lacks the password, the caller is allowed to leave a message on the answering machine, in the usual manner. Thus, no callers are actually blocked because of the installation of the invention. Forgotten callers simply are denied the ability to cause the subscriber's telephone to ring.

Therefore, the invention blocks unwanted telephone calls, yet without requiring a list of persons to block, and without affecting the normal operation of a telephone answering machine. Persons who lack passwords can still leave messages, so no callers are actually blocked. Only the ring signal is blocked. The invention need not issue a prompt to callers to enter passwords, so that callers do not know that password protection is present.

Greater Detail

One form of the invention is an accessory to a common telephone answering machine. FIG. 1 shows an answering machine 3, together with the telephone line-pair 6 which originates at the telephone company's switching office. Block 9 indicates this form of the invention, which is spliced into the line 6. Block 9 contains two standardized modular telephone connectors 10 and 11, for effecting the splice. A Y or T connection can be used to tap into telephone line 6 as well, as can an inductive, non-contact tap.

Block 9A is an enlarged view of block 9. A DTMF (Dual Tone Multi Frequency) detector 12 is connected in parallel with the telephone line pair 6, perhaps through one, or both, capacitors C1 and C2. Lightening protection circuit 13, such as the well known sidactor, may be provided.

Such DTMF detectors are known in the art, and are available, for example, as the DTMF transceiver, part number 146430, available from JAMECO Electronics, 1355 Shoreway Drive, Belmont, Calif. 94002 (800) 831-4242. Such transceivers are also available from Parallax, Inc., 599 Menlo Drive, Suite 100, Rocklin, Calif., 95765, which maintains a web site at parallaxinc.com.

When a DTMF signal is received by the detector 12, detector 12 issues a four-bit signal on bus 15, which identifies the digit (or symbol, such as "*" or "#") represented by each DTMF code. That is, as each DTMF code is received, the detector 12 issues a four-bit signal on bus 15 identifying the DTMF code. Commonly, the four-bit word is a binary signal corresponding to the decimal number of the DTMF code, if the DTMF code represents a number, or two special binary numbers, if the DTMF code represents the "#" or "*" signal. The number zero may be handled in a special way.

The password, in general, will contain multiple numbers, and thus will require multiple DTMF signals.

A microcontroller 20 receives multiple four-bit signals, representing the entered passwords, and compares them with stored numbers, stored in memory 23. The stored numbers are the actual password. If the multiple four-bit signals match the password, the microcontroler 20 causes speaker 25 to issue an audible signal, such as a tone or warbling sound.

Microcontroller 20 can take the form of the BASIC STAMP, available from JAMECO or Parallax, identified above. Alternately, it may take the form of one of the well known PIC controllers (PIC—Peripheral Interface Controller), manufactured by Microchip Technology.

Textbooks are available from JAMECO which explain how to program the PIC series of microcontrollers, including "PIC'n Techniques" (part number 161242); "Easy PIC'n" (part number 136645); "PIC'n up the Pace Intermediate Guide" (part number 145736); "Serial PIC'n" (part number 163871); "Programming and Customizing PIC Microcontrollers" (Part number 163150); and "PIC Personal Introductory Course Book" (part number 163168). Several of these are published by Square 1 Publishing.

Figure 2:
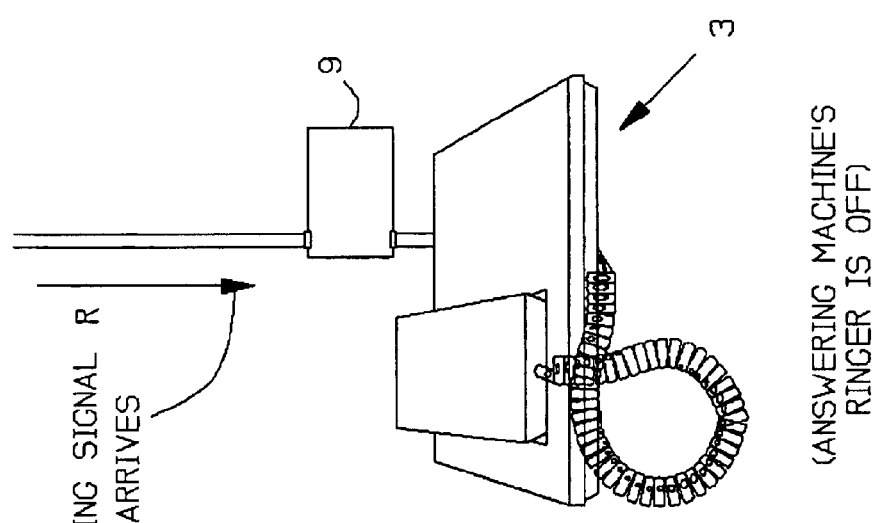
Figure 7:
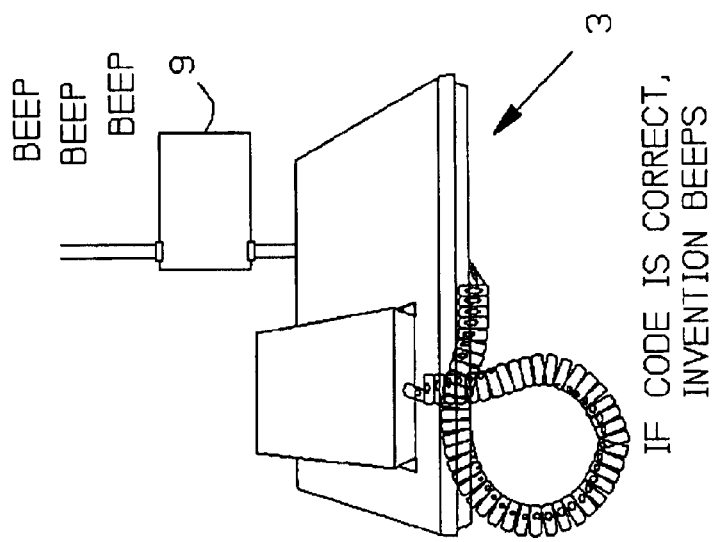

FIGS. 2–9 illustrate graphically one mode of operation of the invention. In FIG. 2, the answering machine's "ringer" is de-activated, as indicated. A "ring signal" R, issued by the telephone company's central office, arrives in the usual manner. A common ring signal in the U.S. is an AC signal, 90 volts rms, at about 16–60 Hz, with a duration of 2 seconds per "ring," with adjacent rings separated from each other by about 4 seconds of silence.

Figure 3:
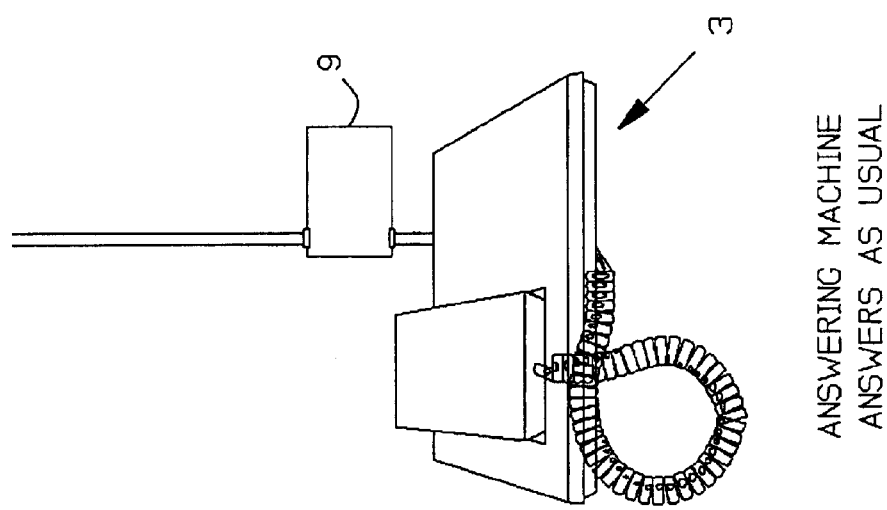

As indicated in FIG. 3, the answering machine answers as usual. Since the "ringer" is de-activated, no ringing sound occurs. Some answering machines may contain relays, so that a faint clicking of relay contacts may arise. Some answering machines contain mechanical tape-, or disc-, drives, which may launch into operation to issue a greeting, and generate some sound. However, apart from these possible faint sounds, and similar faint sounds, the answering machine 3 issues no significant, or disturbing, sounds at this time.

Figure 4:
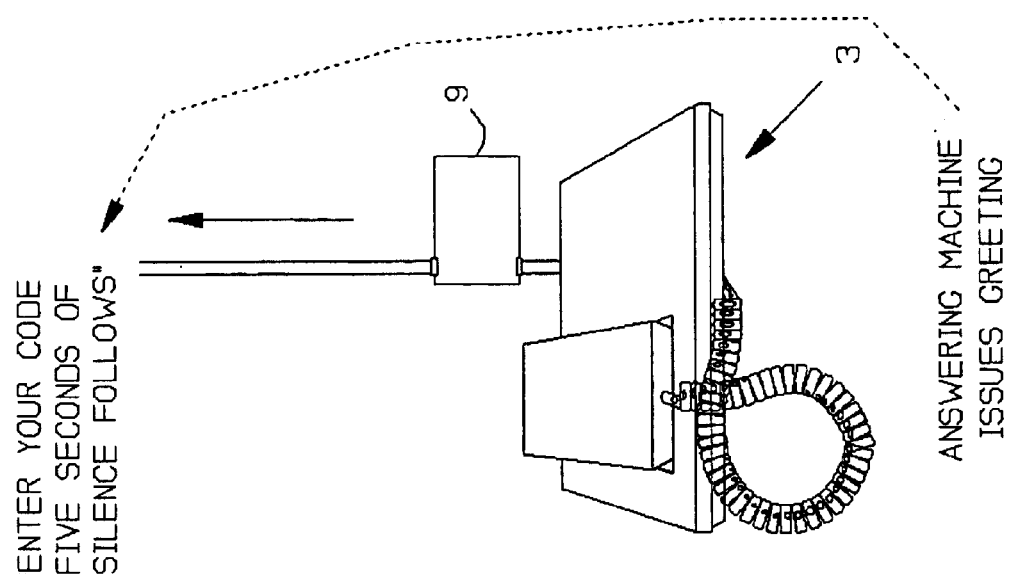
FIGS. 2–9, illustrate a sequence of events undertaken by one form of the invention.

FIG. 4 indicates that the answering machine 3 issues a greeting in the usual manner. However, the content of the greeting may be non-standard. The greeting says something like, "Enter your password. I will remain silent for five seconds."

It should be observed that the greeting is an electrical signal which is transmitted on the telephone line 6 in FIG. 1. It produces no sound locally, at the answering machine 3 in FIG. 4, unless (1) the machine 3 is designed to play the greeting in a loudspeaker and (2) the loudspeaker is activated.

At this time, the answering machine falls silent for five seconds. That is, the person who recorded this greeting places five seconds of silence into the recorded greeting at this time.

Figure 6:
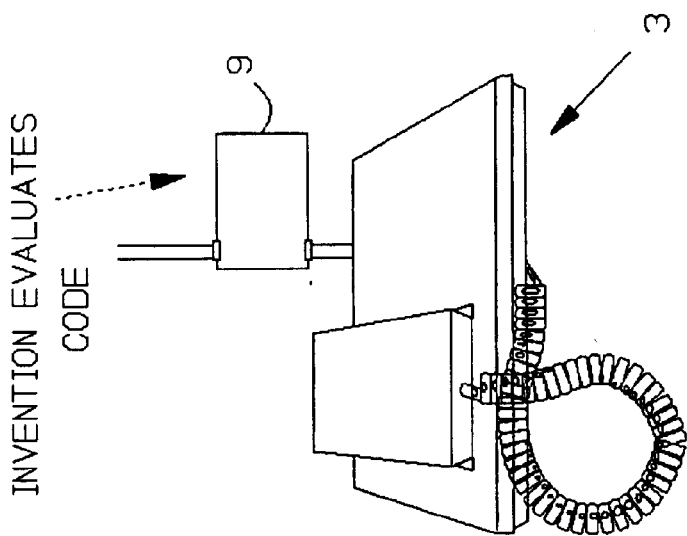
Figure 5:
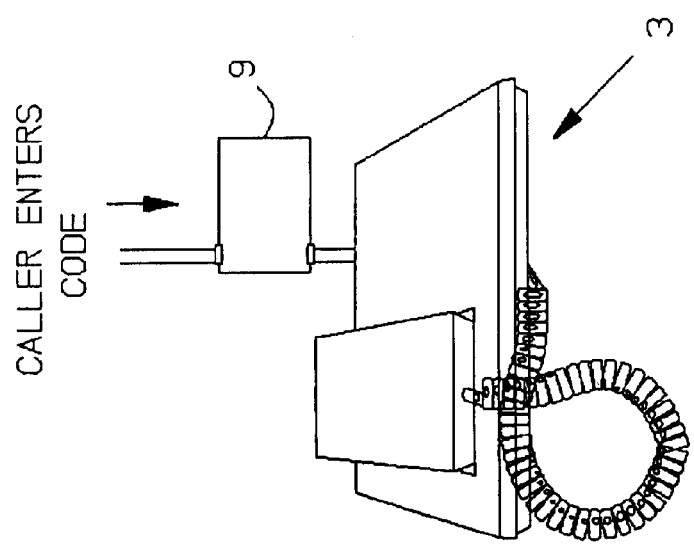

As FIG. 5 indicates, the caller may now enter the code, or password. In FIG. 6, the invention receives the password, and evaluates it for correctness. If the password is correct, the invention issues a signal, such as the "beeping" indicated in FIG. 7. The owner of the answering machine (not shown) may lift the handset 50, as in FIG. 9.

Figure 8:
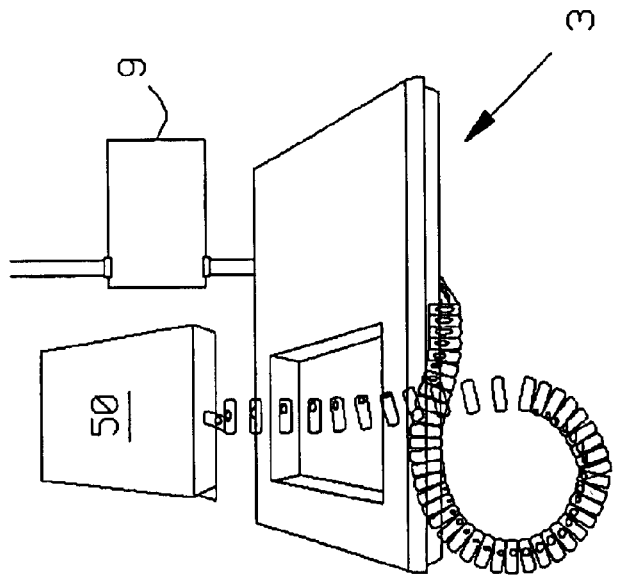
Figure 9:
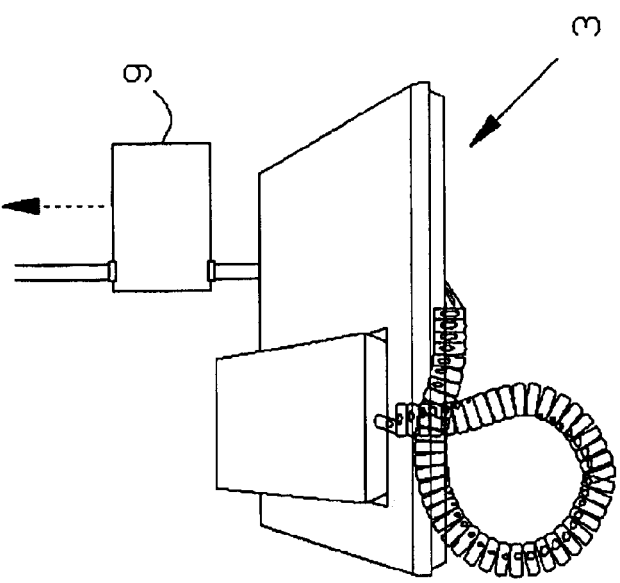

After the five seconds of silence have elapsed, the answering machine continues with its greeting, as in FIG. 8. That continuation may state, "Hello, nobody is home. Please leave a message." The answering machine records the message in the usual manner. If the owner of the answering machine is monitoring it, the owner may lift the handset 50, as in FIG. 9, and accept the call.

As discussed in the Overview, the five seconds of silence indicated in FIG. 4 is not necessarily required. The caller may enter the password while the machine 3 is delivering the greeting, either in FIG. 4 or FIG. 8. The caller may also enter the password during the time allotted to the caller to record a message on machine 3. In these cases, the invention also evaluates the password. If it is correct, the invention actuates the annunciator 25 in FIG. 1.

One possible modification of the sequence of FIGS. 2–9 is that, as discussed above, the prompt of FIG. 4 may be eliminated. The answering machine's greeting may make no reference to any passwords or codes, and may immediately, upon answering, launch into a standard greeting, as in FIG. 8. The caller, by prearrangement, knows that a password is expected during the greeting, and enters it at that time. The DTMF decoder 12 in FIG. 1 is capable of detecting the DTMF codes in the presence of the greeting. In fact, one of the major features of the DTMF system is its high tolerance of noise, including background speech.

Figure 10:
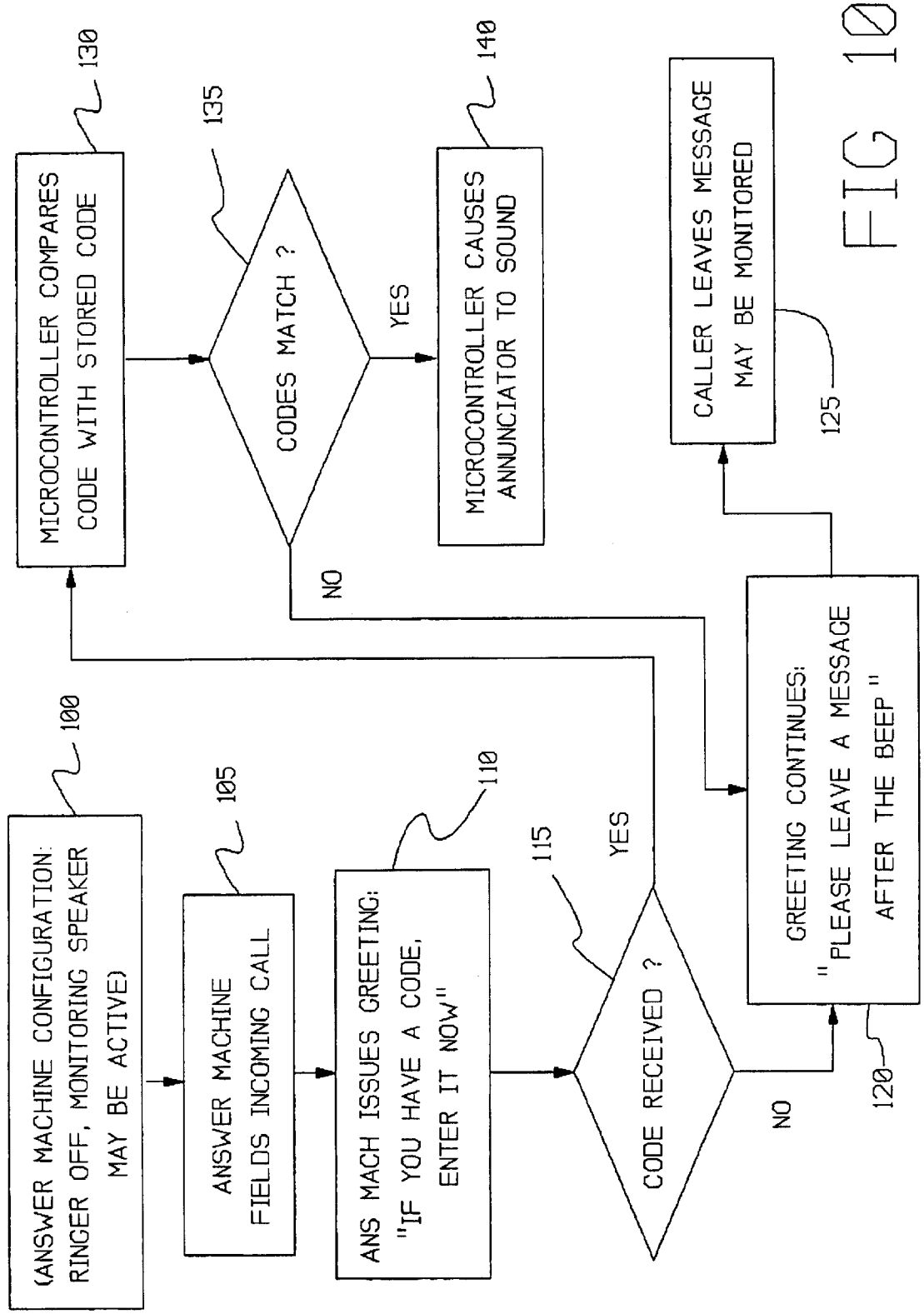
FIG. 10 is a flow chart illustrating procedures undertaken by one form of the invention.

FIG. 10 is a flow chart of steps which the system of FIG. 1 undertakes. Block 100 indicates the initial configuration step of the answering machine 3. Its ringer, or annunciator, (not shown) is de-activated, so that incoming calls do not cause a ring signal: the answering machine is silent when an incoming call arrives. In addition, the speaker of the answering machine may, or may not, be activated, as the owner chooses. The choice is based on whether the owner wishes to "monitor" any incoming messages, as they are recorded by the machine 3.

Block 105 indicates that an incoming call arrives, and the answering machine responds to it in the usual manner: the answering machine goes off-hook, thereby allowing a recorded message to be played to the caller.

Going "off-hook" is a term-of-art, and refers to the machine's response of connecting itself to the telephone line 6 in FIG. 1, to thereby place an impedance on the telephone line 6, which draws a current from the telephone company central office, or switching office (not shown). The central office detects the current, and, in response, terminates the ringing signal, and then connects the caller's telephone (not shown) to lines 6. Now the caller and the answering machine can communicate. During the issuance of the ring signal, however, they cannot communicate, because the caller is not connected to lines 6 in FIG. 1.

Block 110 indicates the initial content of the recorded message: the message invites the caller to enter a code. For example, the message may state, "Enter your password on the keypad of your telephone." As discussed herein, this prompt may be eliminated.

As another example, the message may mislead callers who are unaware of the actual characteristics of the code. That is, persons who know the code will know its length, such as six digits. However, the message may invite the caller to "Enter your four-digit code." This mis-direction will prompt uninvited callers to enter the wrong code, and assist in blocking their calls.

Decision block 115 inquires whether a code was entered. If not, block 120 is reached, indicating that the greeting of the answering machine continues. Then, block 125 is reached, wherein the caller leaves a message, in the usual manner. The password may be entered at this time, and will be detected. Detection may be enhanced if the caller does not speak while entering the password.

Additional steps may be added, such as the following. If the prompt of block 110 is used, and if the NO branch is taken from block 135, a step may be taken which informs the caller that the password is incorrect, and invites the caller to leave a message. This step may utilize the speech-generation circuitry 355 shown in FIG. 11. Also, if the password is correct, the caller may be so informed.

If, in decision block 115, a code was entered, block 130 is reached, wherein the microcontroller 20 in FIG. 1 (1) receives each four-bit word representing a DTMF code from the DTMF detector 12, (2) converts the four-bit word into a decimal digit (or symbol), if desired, and (3) temporarily stores the digits, in a buffer or as a variable.

As to storage as a variable, the BASIC STAMP discussed above allows a programmer to write programs in a variant of the Basic language, which are then compiled into machine language for the STAMP. The programmer may define a variable, such as "p_word," in that Basic program. The program would repeatedly read the four-bit word on bus 15 in FIG. 1. Each time a control line (not shown) of the DTMF detector 12 indicated that a new DTMF code was received, the program would add (more correctly, concatenate) the newly arrived symbol to the variable "p-word."

Thus, for example, as the caller entered DTMF signals, the program would gradually build the variable "p-word," for example, in the following sequence:

password=1
password=31
password=931
password=5931
and so on.

In this example, a "1" was received first, then a "3", then a "9," and then a "5."

The program would inquire whether the password is correct. This inquiry cane be made at different times, as instructed by the programmer. For example, the program could make inquiry every time a new DTMF code is received. However, this would prevent mis-direction of prompting the user to enter a password which is too long. That is, if the passwords are 4 digits long, and the misdirection instructed callers to enter 6-digit passwords, the password would still be evaluated when four digits were completed. Although that password will likely be wrong if the caller is not authorized, nevertheless, the misdirection did not work.

As another example, the program could make inquiry only after X DTMF codes have been received. "X" can be an integer from 1 to 20. Thus, if the passwords are 4 digits long, inquiry would be made after 4 digits are received.

As another example, the password can be designed to begin and end with special DTMF codes. For example, the password may be "3344." The codes may be the "*" key. Therefore, the actual password entered by the caller would be "*3344*". The microcontroller 20 is programmed to recognize the "*" signals as the delimiters of the password. When the second "*" is received, the controller 20 evaluates the password.

As another example, the program could be instructed to make inquiry only after a delay of Y seconds after the last DTMF code. "Y" can be, for example, an integer from one to 10. Since, ordinarily, a person will stop entering codes after the last digit of the password, this approach will evaluate the password Y seconds after the last DTMF code.

The microcontroller 20 then compares the received digits (that is, the code entered by the caller) with a sequence of digits stored in memory 23 in FIG. 1. If a match occurs in decision block 135, then block 140 is reached, wherein the microcontroller 20 in FIG. 1 actuates annunciator 25, which issues an audible sound. If no match occurs, the NO branch of decision block 135 is taken, the annunciator 25 is not actuated, and block 120 is reached.

The owner of the answering machine may monitor the call, in the usual manner, and may take the answering machine's handset off-hook, if desired at that time, to speak with the caller.

Significant features of this operation are the following:

1. All calls reach the answering machine, for recording, unless the handset 50 is raised. No caller is blocked from leaving a message because of (1) lacking the password or (2) entering the password incorrectly.

It should be observed that, even if the annunciator 25 in FIG. 1 is activated because of reception of a correct password, the owner of the answering machine still may not answer the incoming call. The caller may leave a message, in the usual manner.

2. No alteration in the operation of the answering machine is required. A standard, commercially available answering machine will suffice. The only change is in the type of message recorded: the altered message prompts the caller to enter the DTMF code, and then leaves a silence of a few seconds, to allow the DTMF detector to detect the DTMF signals.

The silence may not be necessary for detection of the DTMF signals, but is preferable, because a continued message is seen as distracting the caller from the task of entering the DTMF codes. As discussed above, the prompt, and silence, may be eliminated.

3. As stated above, all callers are allowed to leave messages. However, the answering machine itself does not "ring" when a caller calls. The only semblance of ringing occurs when the caller enters the proper code, the microcontroller 20 detects it, and causes annunciator 25 to sound.

Therefore, the answering machine receives calls in silence. It only announces an incoming call when the caller presents the proper secret code. Thus, the owner of the machine remains undisturbed, except by persons to whom the secret code has been previously given, if they enter it.

4. As stated above, the prompt to enter a password may be eliminated from the greeting.

Additional Considerations

1. The microcontroller 20 in FIG. 1 continually "listens" to the telephone line 6. Not only will it receive DTMF signals when callers enter passwords, but it will also receive DTMF signals when hackers attempt to guess the password. It will also receive DTMF signals whenever the owner of answering machine 3 places an outgoing telephone call, and at other times.

Thus, the memory location (buffer or variable such as "p_word") where the controller 20 stores the detected DTMF signals can be expected to contain residual DTMF codes at all times. Those codes must be eliminated when a password entered by a current caller is to be evaluated in blocks 130 and 135 in FIG. 10.

One approach would be to periodically erase the memory location, or program variable(s), holding the codes. However, if the time-of-erasure coincides with the time-of-entry of a password by a caller, problems may arise, although the erasure process can be extremely fast.

Another approach is to inquire whether DTMF codes are presently being received. If not, then the erasure occurs. The erasure can be accomplished in an extremely short time, so that, even if an incoming DTMF signal arrives immediately after erasure begins, the erasure will complete before the DTMF signal disappears from bus 15 in FIG. 1. This is certainly true if the DTMF detector 12 is designed to be of the "latching" type, wherein it holds each four-bit word on bus 15.

A third approach eliminates these problems. In that approach, all passwords are required to begin with a specific character sequence, such as "##", namely, two "pound" signs, or another specific sequence. This sequence may be called an initialization sequence. Whenever the microcontroller 20 receives the initialization sequence, it knows that a caller is attempting to enter a password. In response, it erases any existing DTMF signals, or password fragments, in storage, and starts accepting a new password.

It is not strictly necessary that DTMF signals be stored. For example, the matching process of the incoming DTMF signals and the password may take the form of a state machine. That is, for example, assume that the password is "345." A certain routine looks for a "3." When the "3" is received, the program jumps to another routine, which looks for a "4." When the "4" is received, the program jumps to another routine, which looks for a "5." When the "5" is received, the program jumps to a routine which actuates the annunciator. If any of the routines receive a number other than "their" number, the program jumps to the first routine, which looks for the first number of the password.

Thus, if a state-machine approach is taken, DTMF signals may not be captured and stored by the processor 20. In this case, if the initialization sequence is used, the processor simply jumps to the state-machine-routines, when the initialization sequence is received, and starts looking for the password. A state machine can be used to detect the initialization sequence.

It is not necessary to use a processor to perform the detection procedures. Hard-wired state-machines can be used, as well as other approaches.

If a delimiter is used to mark the end of the password, such as another "#" sign, the microcontroller 20 stops receiving when the "#" is received.

Thus, a routine is added to FIG. 10, which continually monitors the line 6 for a specific character, or characters. When those character(s) are detected, such as two "#" symbols, then existing, stored DTMF codes are erased, and not considered as part of an incoming password.

2. If a specific character sequence ("##") is required at the beginning of a password, another type of misdirection can be applied to thwart unauthorized callers. For example, if the passwords must begin with "##", or two "pound" signs, the greeting may state that passwords must begin with a different sequence, such as "22." If the caller believes that misdirection, and enters the "22," the caller thereby betrays the fact that the caller is not authorized. The processor 20 is programmed so that, whenever a caller accepts the misdirection, the caller is treated as unauthorized, and annunciator 25 is not actuated.

Figure 11:
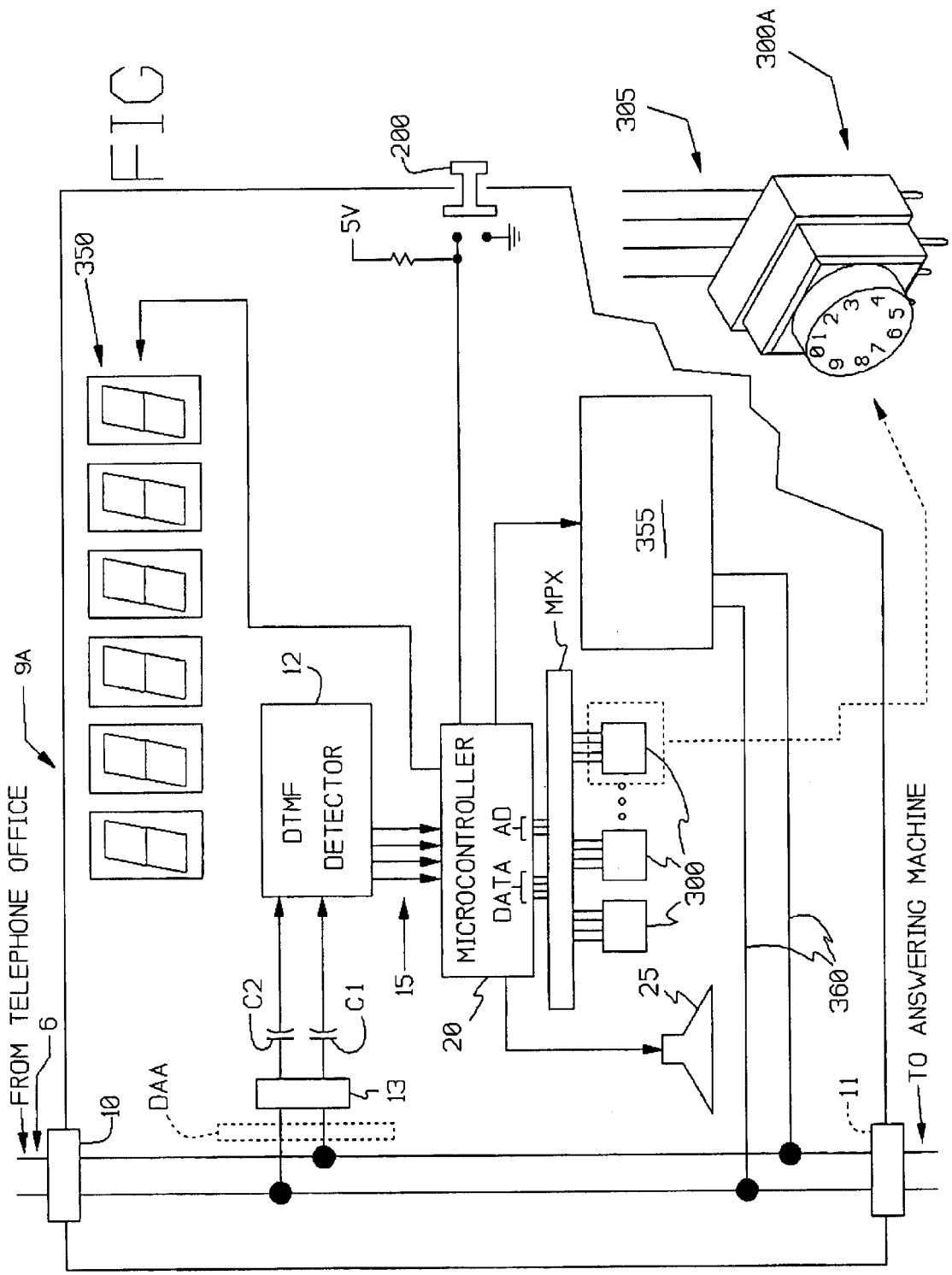
FIG. 11 illustrates one form of the invention.

3. The memory 23 in FIG. 1 may take the form of several rotary switches 300, as indicated in FIG. 11. Rotary switches are commercially available which have ten switch positions, one for each digit from zero to 9, as indicated in the inset switch 300A. When the switch 300A is rotated into a position, is presents a four-bit word on four output lines 305. Those lines 305 are connected to processor 20.

Hexadecimal rotary switches are also available, which produce all combinations from 0000 to 1111.

Thus, if five such switches are used, the processor receives 5 groups of 4 bits each. Five switches, or five digits, provide a total of 99,999 possible different combinations.

If the password is required to begin with specific character(s), a corresponding number of the rotary switches 300 can specify the character(s). Thus, if the password is 5 digits long, and the specific characters are "##", then seven rotary switches will be required.

The rotary switches 300A provide the benefit that the password existing at any given time is known from a visual inspection of the positions of the rotary switches.

Ordinary DIP switches can also be used. The password existing at any given time can also be ascertained from an inspection of the DIP switches. However, such an inspection provides the password in the form of a binary number, which is difficult to understand for many people.

Therefore, while DIP switches may be used in one embodiment, another embodiment specifically precludes the use of ordinary DIP switches, which exhibit a binary number. So-called rotary DIP switches 305 are preferred, as shown in FIG. 11. They directly indicate the decimal, hexadecimal, or octal number to which they are set, depending on their design. More generally, they directly indicate the character to which they are set.

Five rotary switches, each providing four lines, will require 20 input lines of the controller 20. To reduce the number of lines, the rotary switches can be multiplexed, as by using multiplexer MPX. In this case, after the rotary switches 300A are set by the user, a signal is issued to the processor 20, as by pressing the resert button R in FIG. 1. The processor 20 then applies an address signal on address bus AD in FIG. 11, which addresses one of the switches 300. When the switch is addressed, the data lines DATA then contain the word to which that switch is set. The processor 20 reads the word, stores it, and then proceeds to the next switch. The processor 20 continues to multiplex through all the switches 300, until it has read them all.

Figure 12:
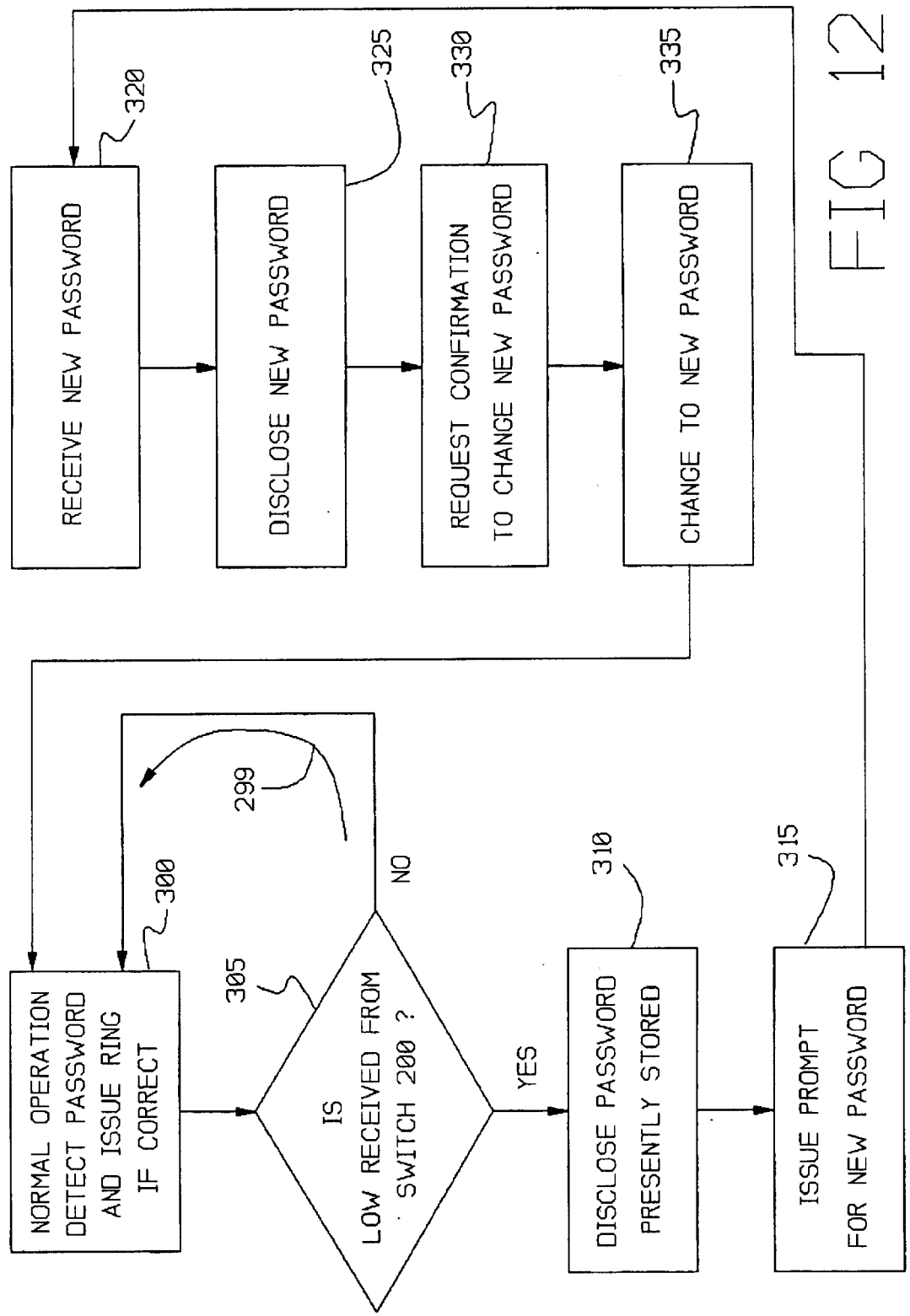
FIGS. 12 and 13 are flow charts illustrating procedures undertaken by one form of the invention.

4. Rotary switches add cost. The answering machine 3 in FIG. 1 is already equipped with switches on its keypad (not shown), and those can be used to enter the password into memory 23. FIG. 12 is a flow chart illustrating one approach to setting, or changing, the password.

The apparatus 9A in FIG. 11 is equipped with a switch 200. Preferably, switch 200 is spring-biased into the position shown. Consequently, processor 20 normally receives a signal of 5 volts, or a logic HIGH. When the switch 200 is pressed, it issues a LOW signal, indicating that password-change mode should be entered.

Switch 200 is spring-loaded in order to prevent the user from selecting password-change mode, and then forgetting to exit that mode. The program running on processor 20 could also be instructed to exit password-change mode 60 seconds, or other delay, after that mode were entered.

Block 300 in FIG. 12 indicates that the system performs the password-evaluation functions described above. When the correct password is received, processor 20 in FIG. 1 causes annunciator 25 to sound. The system idles in loop 299, waiting for passwords, so long as switch 200 in FIG. 11 is not pressed.

When switch 200 is pressed, decision block 305 detects the press, and causes the logic to reach block 310. That block causes the existing password to be disclosed to the user. Numerous approaches are possible for this disclosure. In one approach, device 9A in FIG. 11 is equipped with visual displays, such as the seven segment displays, SSDs, 350, which contain LEDs. In another approach, device 9A is equipped with speech-synthesis circuitry 355, which reports the current password on lines 360. The handset 50 of the answering machine 3 in FIG. 1 allows the user to hear the password. Alternately, the speech can be delivered through annunciator 25, which acts as a loudspeaker.

Next, device 9A issues a prompt for a new password, in block 315 of FIG. 12. This prompt can be given on display 350, or through speech-synthesis circuitry 355, or by actuating an LED (not shown) on the housing of device 9A, which is adjacent a sign which states "Enter new password now" (sign not shown).

Block 320 in FIG. 12 indicates that the user enters the new password. The user does so through the keypad (not shown) of the answering machine 3. That is, each key press issues a DTMF signal, which is accepted, and recognized, by the DTMF decoder 12. The processor 20 receives the sequence of DTMF signals and stores them, as the new password. The old password may be retained temporarily in memory, if the user wishes to revert to it.

Block 325 indicates that the newly entered password is disclosed to the user, as by display 350 or the speech synthesis circuitry 355. Block 330 requests confirmation that the new password is acceptable, as by requesting a "pound" sign.

If the user indicates that the new password is acceptable, block 335 indicates that the system begins using the new password. These steps can also be used to establish a password for the first time. In that case, the disclosure of block 310 would read "none," or a similar message.

If the user merely wishes to view the current password, the system can be arranged so that the display 350 in FIG. 11 always presents the current password to view. Alternately, when block 310 is reached in FIG. 12, the current password is displayed. If the user does nothing further for, say, 20 seconds, the logic returns to loop 299, and the password disappears.

5. A significant feature of switch 200 in FIG. 11 is that it prevents hackers from changing the password by way of incoming telephone calls. That is, in one approach to password-changing, a special sequence of DTMF codes could be used to place the processor 20 into password-change mode. While this approach can be used, it would, in theory, allow hackers to change the password by way of incoming telephone calls. Switch 200 requires that the person altering the password be physically present at the device 9A.

6. Assume that lines 360 in FIG. 11 are absent. A significant feature of the invention is that it applies no signals at all to telephone line 6. That is, the input impedance of DTMF detector 12 is very high, or can be made very high, in the range of mega-ohms. For example, if the CM8880DTMF Transceiver, available from California Micro Devices, 2000 W. 14th Street, Tempe, Ariz. 85218, is used, the input resistance is about 10 mega ohms, ot ten million ohms.

Such a large input impedance is tantamount to an open circuit. That is, in effect, such an impedance is no different than a telephone outlet, with no telephone attached.

Therefore, depending on the applicable government regulations, no special protective circuits are necessary in FIG. 11, in order for the device to connect to the telephone lines. One such protective circuit which may be used is labeled DAA, which is an acronym for Data Access Arrangement. DAA's are commercially available, such as model XE0002B, from Xecom, Inc., 374 Turquois Street, Milpitas, Calif. 95035.

In the U.S., DAA's are approved in advance by the Federal Communication Commission, FCC, for attachment to telephone lines. Thus, by using an approved DAA, one avoids the requirement of obtaining approval of one's device, because only the DAA is effectively connected to the telephone system.

In one form of the invention, a DAA or equivalent is used. In another form of the invention, no DAA is present, and the DTMF detector is connected directly to line 6, perhaps through coupling capacitors, or an audio transformer (not shown). Lightening protection 13 may be provided.

7. Multiple passwords can be provided. That is, memory 23 can be arranged to store multiple passwords. If a caller presents any of the passwords, annunciator 25 is actuated.

8. Security devices utilizing passwords commonly allow a person several attempts to enter a password, such as three attempts, and then block further access. In one form of the invention, no such blockage is undertaken. One reason is that repeated password attempts are seen as unlikely. If the password is 5 decimal digits in length, almost 100,000 possible passwords exist. It is believed that no hacker would attempt to crack such a password, especially since the password can be changed immediately upon detection of cracking.

9. Continuing point 8, the processor 20 performs an evaluation on a password. In one form of the invention, the caller may be allowed to enter as many passwords as desired. For example, if the password must begin with "33," then every time the caller enters a password beginning with "33," another evaluation is made.

Alternately, each caller is allowed only one evaluation. If the caller's password fails, no evaluation is made until a new ring signal is received. Alternately, since the hacker can synthesize a ring signal, other indicia that a new call has been received can be used. For example, the processor 20 can "go to sleep" until a dial tone is heard again.

As another alternate, time limits can be imposed. For example, each time a password fails, one minute can be required to pass before another password is evaluated. If a call is received before the minute expires, the call is necessarily routed to the answering machine, since no password evaluation will occur.

10. In one form of the invention, the components residing in block 9A of FIG. 1 are used, and no others, with the exception of a power supply, which is implied. In one embodiment, components R and PL, discussed below, are not used. In another embodiment, components R, PL, and 200A are not used.

11. If the BASIC STAMP is used, the password can be included in its program. That is, a program can be loaded into the BASIC STAMP from a microcomputer through a serial line. That program can contain data statements, or variables, which define the password. The password can be changed by changing those statements/variables, and loading the program anew. A similar comment applies to other types of processor, if they can be re-programmed.

12. Detailed instructions, and program code, for causing the CM8880 DTMF transceiver to recognize DTMF codes is published, and is available from the web site located at www.parallaxinc.com/
downloads/Documentation/
Application %20Kits/
CM8880%20DTMF %20Transceiver/
CM8880%20Transceiver.pdf These instructions are hereby incorporated by reference.

Parallax, Inc., sells a kit which contains these instructions, and also contains the components necessary to interface the CM8880 transceiver to a BASIC STAMP.

13. An additional momentary contact switch 200A can be provided in FIG. 1. This switch connects to a pin on the processor 20. When the processor 20 detects that this switch 200A changes state, the processor 20 terminates the sound produced by the annunciator 25. Thus, when the owner hears the annunciator 25 sounding, and lifts handset 50, the owner also actuates switch 200A, to thereby terminate the sounding of annunciator 25.

Switch 200A is preferably larger in size than switch 200, to avoid confusion between the two, because the latter switch will be utilized less often than the former. For example, switch 200 can be small, and placed in a recess on the bottom of the accessory 9. Switch 200A can be equipped with a large, protruding button, say 1×2 inches, and be located on the top of accessory 9A.

Switch 200A can be constructed to operate automatically. It can be attached to the end of a signal line, and attached to the answering machine 3, near the handset. When the handset is lifted, switch 200A automatically issues a signal to processor 20, and causes the annunciator 25 to fall silent.

14. A pilot light PL in FIG. 1 can be added, which is illuminated, and visible externally, when the apparatus 9A is operational.

15. A significant feature of the invention is that it response to DTMF signals on line 6. Those can be generated by the answering machine 3. Thus, if a party wishes to test the invention, the party merely enters the password on the answering machine 3, after lifting the handset 50. If the password is correct, device 9A will actuate annunciator 25.

16. A reset switch R can be provided in FIG. 1. This will re-initialize the processor 20, which can sometimes be needed, because the processor 20 may reach a locked state. Certain BASIC STAMPS are pre-equipped with reset switches.

17. Comparing DTMF signals with a stored password was discussed above. However, many different types of matching can be used. For example, the password may be "5566." One type of matching is to require the DTMF signals to match those digits, in the same sequence: 5566. This will be called an "exact match."

Another type of matching may require the same number, and type, of digits, but in any sequence. For example, two fives, and two sixes, may be required, but in any sequence. Thus, if "5656" is received, a match would occur.

Another type of matching may be rule-based. That is, the password may be required to contain six digits, all different, such as "123456" or "456789."

Therefore, exact matches may be required, or other types of matches, such as matches which follow certain rules. One reason for this is that, depending on the rule chosen, hardware implementations may become drastically simplified. The use of a state machine provides one example.

Additional Embodiment

The preceding discussion was framed in terms of a device associated with an answering machine. The device detects a password, and issues a ring signal if the password is correct. One goal is to prevent parties lacking the password from causing the answering machine to ring, thereby disturbing the machine's owner.

A different approach can achieve similar results. The public-service telephone companies can offer password-protection service. For example, each subscriber is allowed to select a password, or no password at all. Whenever a caller attempts to place a telephone call to a subscriber, and if the subscriber has chosen password protection, the caller is required to append the password to the telephone number, in order for the subscriber's telephone to ring.

For example, a subscriber's telephone number may be 444-3232. The subscriber may choose the password of 1111. Thus, if a caller wishes the subscriber's telephone to ring, the caller must enter the sequence "444-3232" followed by "1111."

Figure 13:
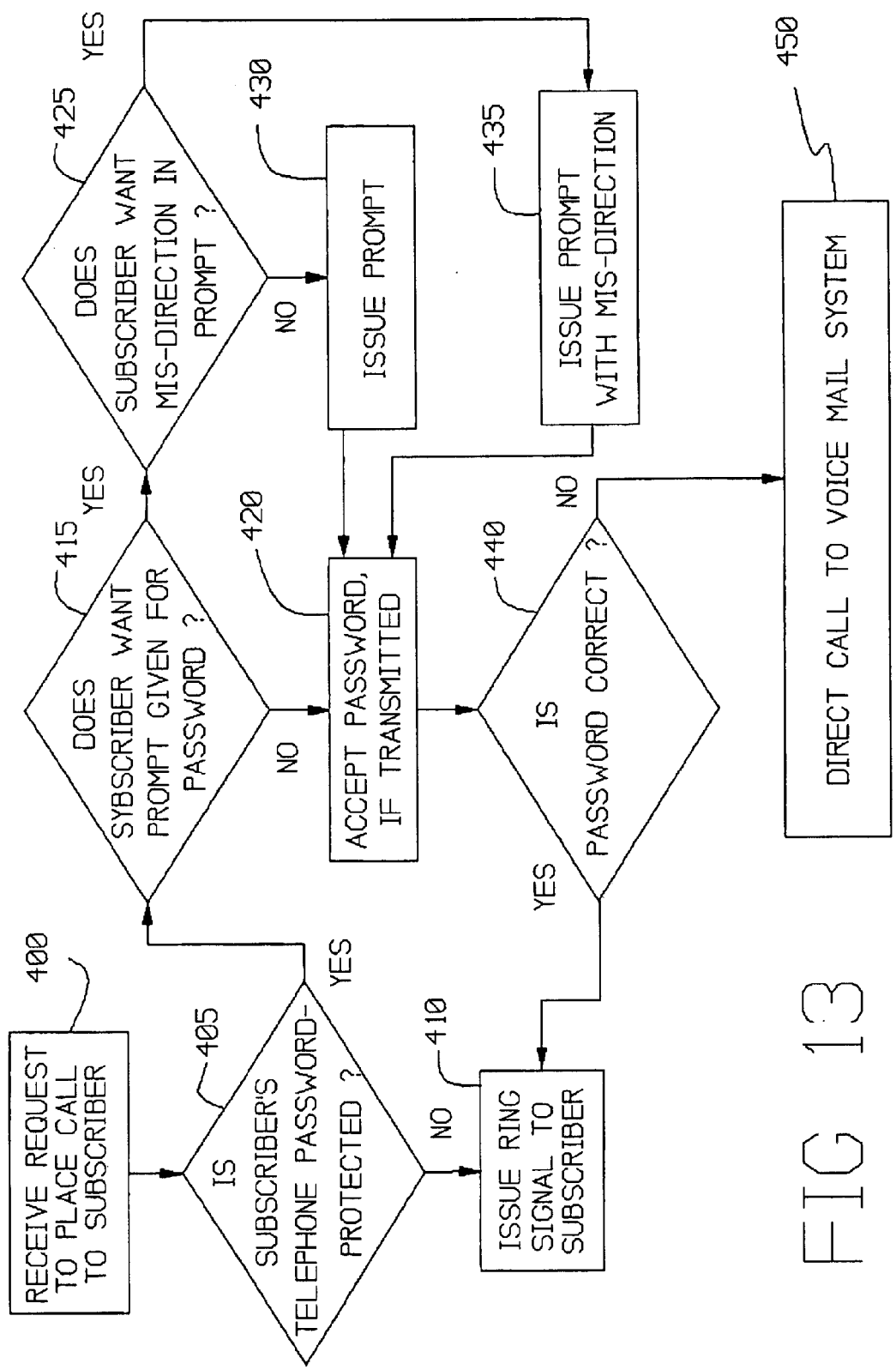

FIG. 13 is a flow chart of logic which implements one form of the invention. Automated equipment at the telephone companies' offices perform the functions described. In block 400, a caller attempts to place a call. The caller makes a request of her local telephone servivce provider to place the call, by taking her telephone off-hook, and entering the telephone number of the party to be called.

The telephone service provider, in decision block 405, inquires whether the party-to-be-called has requested password protection. If not, block 410 is reached, and the call is placed in the usual manner.

Figure 14:
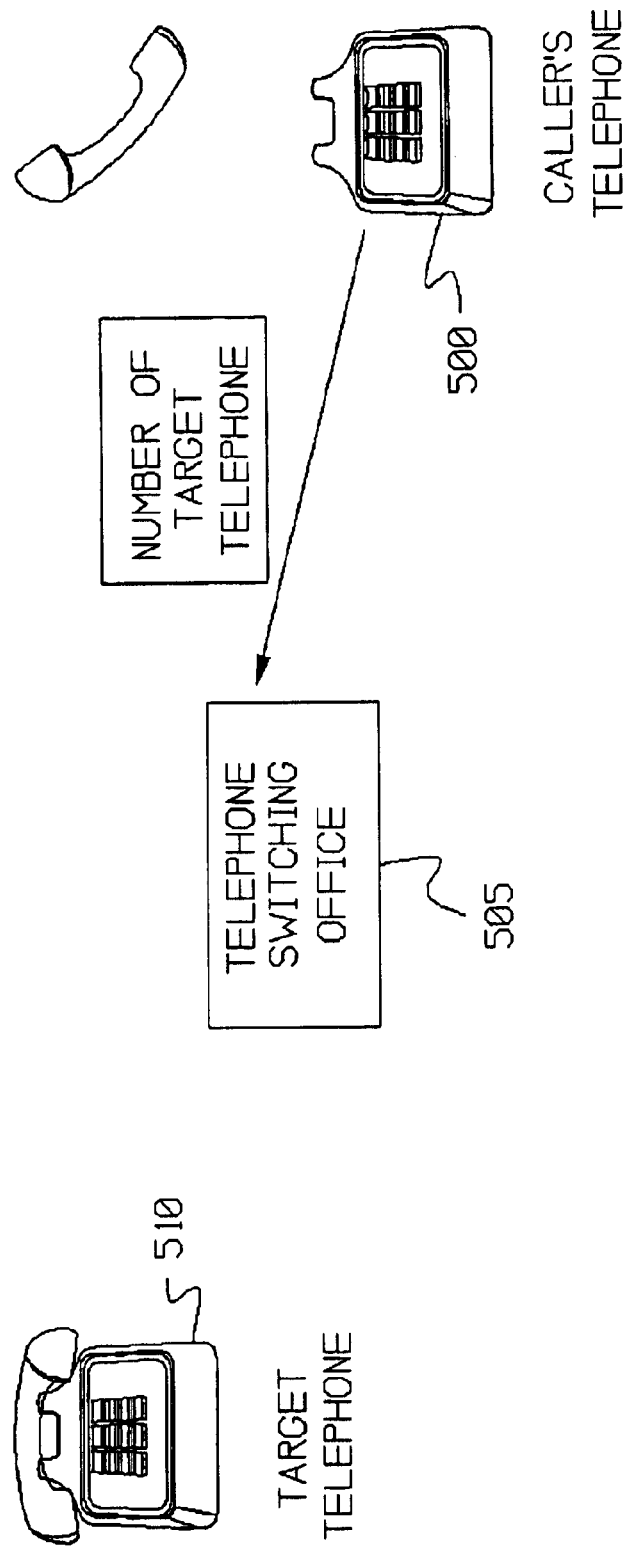
FIGS. 14–17 illustrate a sequence of events undertaken by one form of the invention.
Figure 15:
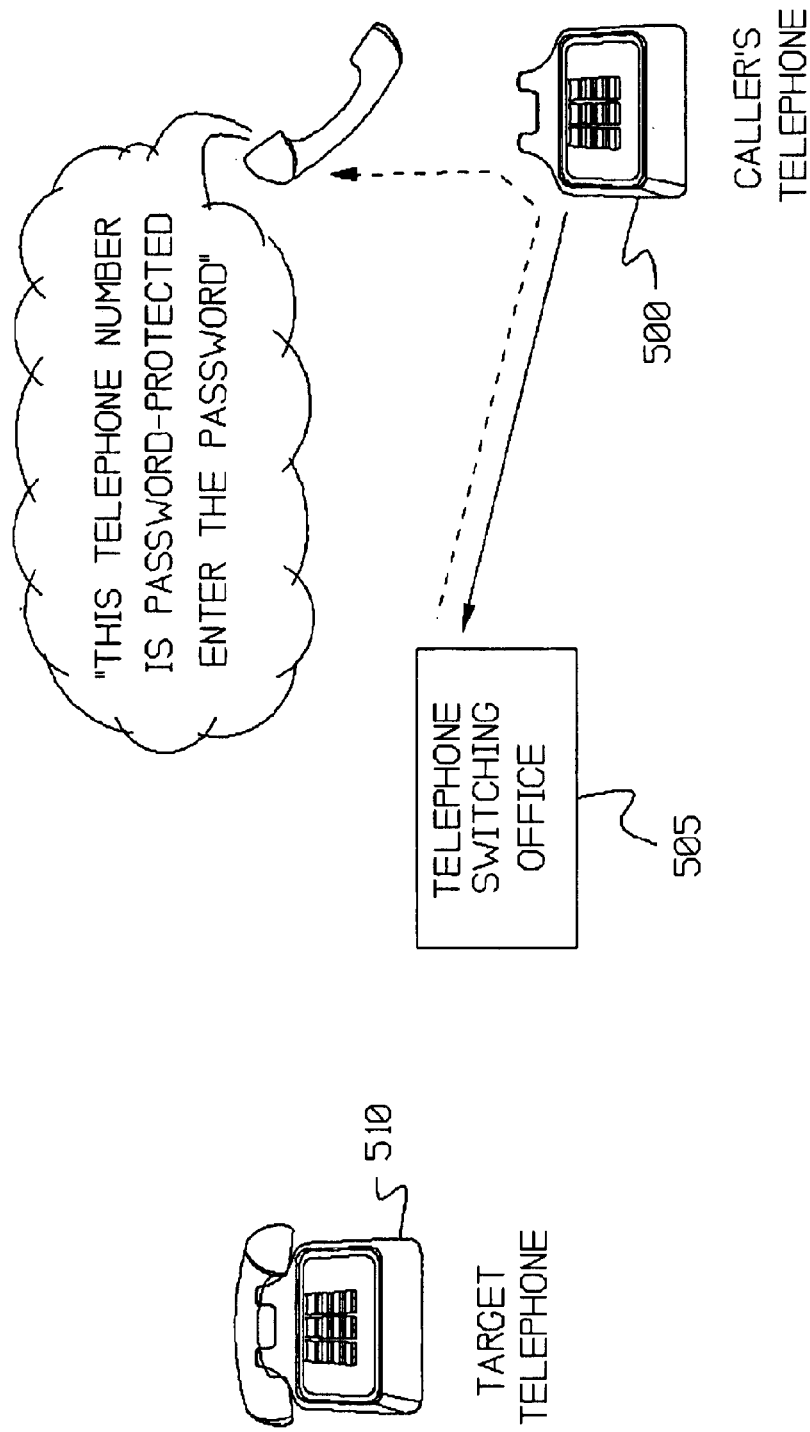

If the YES branch is taken from decision block 405, decision block 415 is reached, wherein the provider inquires whether the party-to-be-called has requested that a prompt for a password be issued to the caller. That is, the party-to-be-called may not want the caller to be prompted to enter a password. If not, the NO branch is taken, block 420 is reached, and no prompt is issued. FIGS. 14 and 15, described later, provide an example of a prompt.

If a prompt is requested, the YES branch is taken from block 415, and decision block 425 is reached. In that block, the telephone service provider inquires whether the party-to-be-called requested that a mis-directing prompt be issued. For example, the prompt may deliberately describe the password is to be entered incorrectly, as by asking for a 3-digit password, when all passwords must be 5 digits.

As an alternate to block 425, or in addition to it, the block may inquire whether the customer has provided the customer's own prompt. That is, the customers may be allowed to write, or record, their own prompts, perhaps in their own voices.

Accordingly, blocks 430 or 435 are then reached, with one of them implicitly referring to issuance of the custom prompt, if appropriate. After the prompt is issued, block 420 is reached.

In that block, the caller enters the password. Block 440 evaluates the password. If correct, block 410 is reached, and the telephone provider issues a ring signal to the party-to-be-called. If the password is not correct, block 450 is reached, and the caller reaches the voice mail box of the party-to-be-called.

FIGS. 14–17 illustrate graphically one mode of operation of the system just described. In FIG. 14, a caller's telephone 500 delivers to the telephone switching office 505 a number of a target telephone. That "number" is the telephone number which was just entered in telephone 500, and refers to the target telephone 510.

The switching office 505 determines whether the owner of the target telephone 510 has requested password protection. If so, the switching office 505 issues the message shown in FIG. 15. That message requests a password from the caller's telephone 500.

Figure 16:
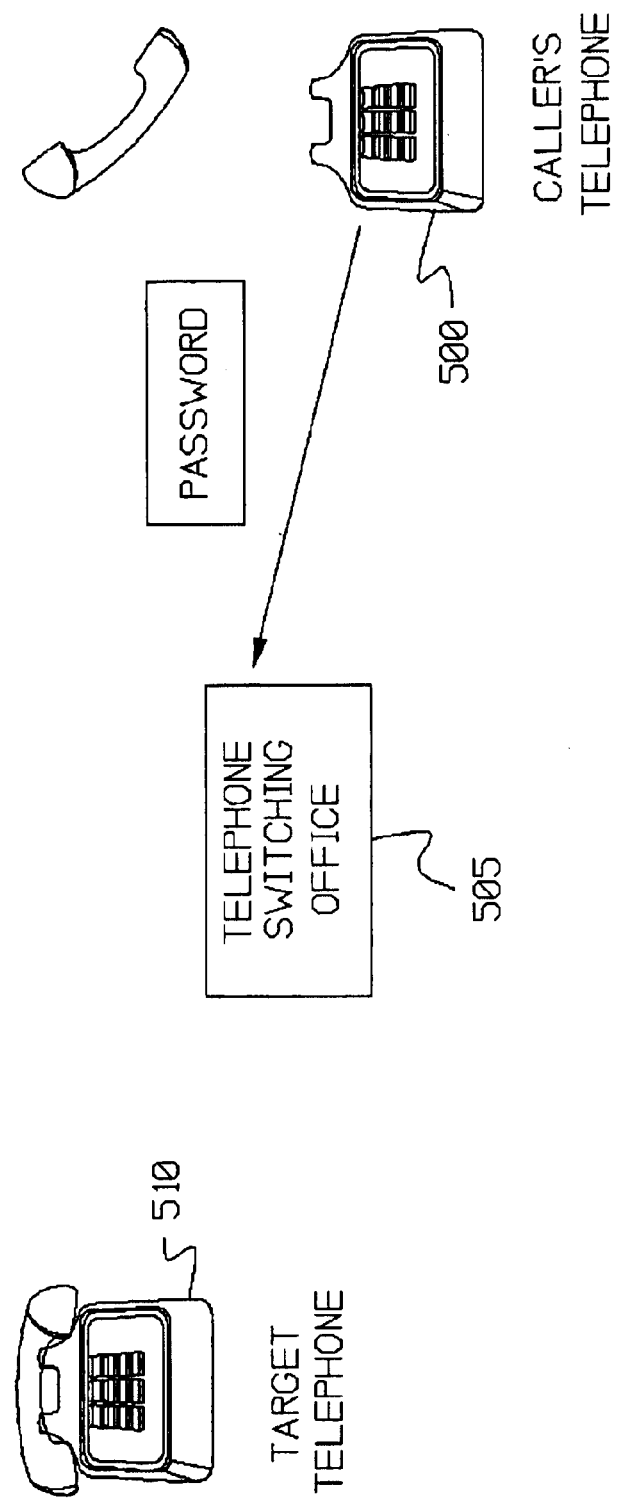
Figure 17:
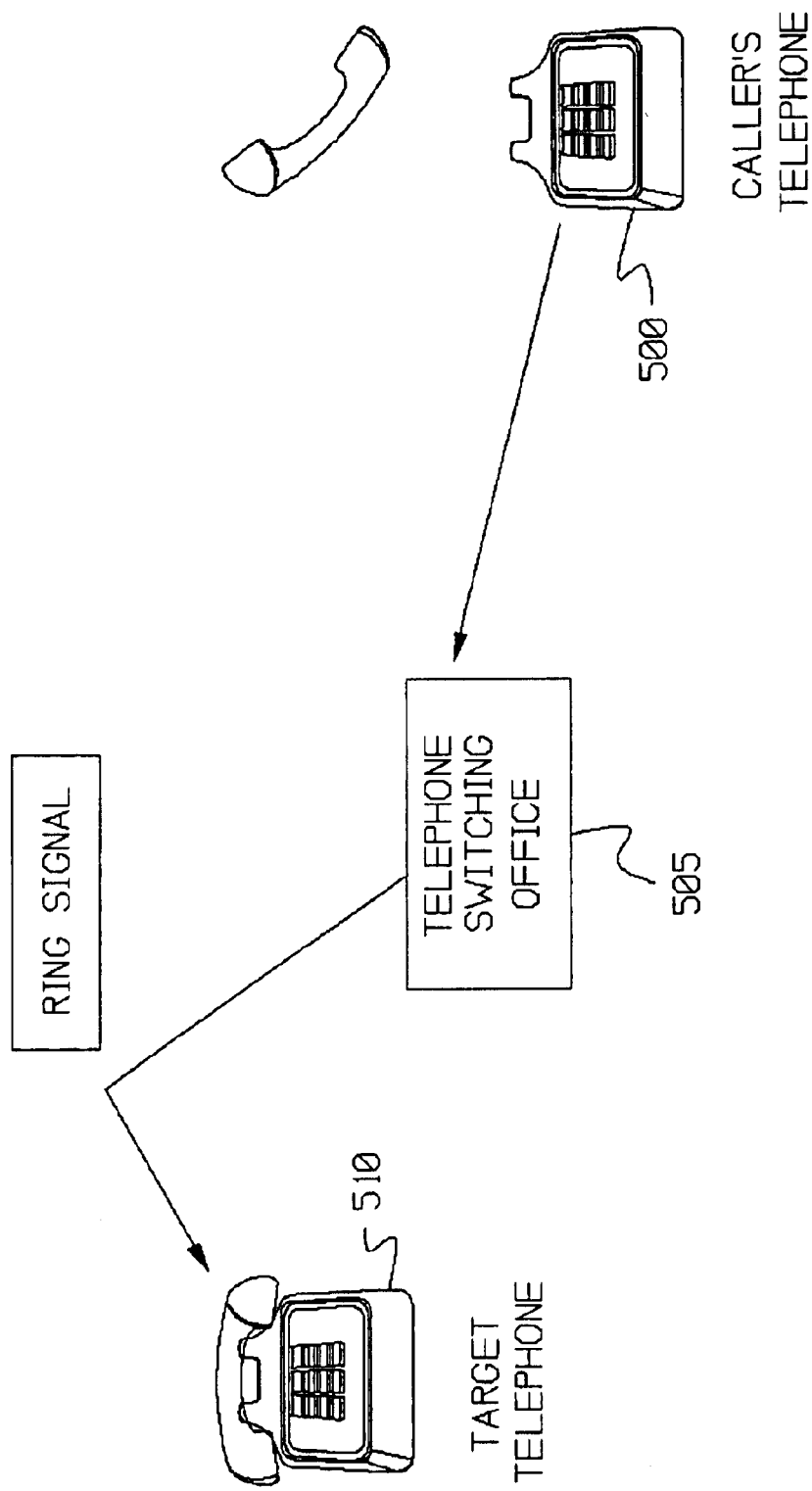

In FIG. 16, the caller's telephone 500 delivers a password. If the password is correct, the switching office 505 issues a ring signal to the target telephone 510 in FIG. 17, and the call proceeds in the usual manner.

If the password is not correct, the switching office 505 routes the caller to a voice mail system (not shown), where the caller may leave a message.

As explained above, the prompt of FIG. 15 is optional. The caller may be required to enter the telephone number of the party-to-be-called, followed immediately by a password. The telephone service provider extracts the telephone number, looks up the password assigned to that number, and inquires whether the password just entered matches it. If so, the call is allowed to proceed. If not, the caller is routed to a voice mail system.

Additional Considerations

1. If the same telephone switching station provides telephone service to both the caller and the called party, that station can perform the password verification, such as the steps shown in FIG. 13.

However, if the caller resides in a different city than the called party, different telephone companies may provide telephone service to each. In this case, the telephone company receiving the DTMF signals from the caller will not necessarily know the password of the party-to-be-called.

One solution to this problem is cooperation among the telephone companies. Every company notifies every other company of its customer password list once per day. That is, for example, every company, in effect, maintains a nationwide, or world wide, list of telephone numbers, including area codes and country codes. Associated with each telephone number is a password, if the customer has chosen password service.

Every telephone company broadasts the list to all others, once per day, as at 3:00 am, when traffic is light. Thus, no matter where a call is placed, the telephone switching station receiving the placed call has access to the password of the called party, and will route the call accordingly.

This broadcast can be accomplished using the Internet, as by transmitting e-mail messages. Further, traffic on the Internet can be reduced by initially transmitting a list of telephone numbers, with a password for each. After that, the only transmissions made are changes in passwrods. Changes are expected to be infrequent.

As another alternate, a single list can be maintained, at a single web site, which is accessible only to telephone service providers. This can be accomplished, for example, by using dedicated, private, telephone lines to reach the site. Members of the general public cannot reach the site, even if they "knew" the telehone number of the site, which is impossible. The reason is that a physical connection between them and the site is impossible to achieve.

As each telephone service provider needs to find the password assigned to a telephone number, it contacts the site, and ascertains the password. Subscribers would select, and change, their passwords through their own telephone service providers. The subscribers would not be granted access to the web site.

Another solution is to relay the password from the originating switching station to the switching station of the called party, at the time the call is placed. The switching station of the called party will know the password which the subscriber selected.

That station will examine the password, and either (1) ring the target telephone or (2) route the call to a voice mail system. This procedure has advantages when the latter switching station maintains the voice mail system to which the caller may be routed.

To repeat, the switching station of the caller extracts the password from the string of numbers delivered to it. That station transmits the password to the switching station of the called party. The latter station evaluates the password, and takes the appropriate action.

2. A difference exists between the accessory described at the beginning of this Specification, and the approach taken by the telephone company just described. In the former, a normal ring signal is applied to the customer's line by the telephone service provider. Then, when the answering machine goes off-hook, and the telephone switching office connects the caller to the answering machine. At that time, the password, if any, is received by the accessory. The telephone service provider does nothing different.

In contrast, when the telephone switching office checks for the password, no ring signal is applied initially to the line of the party-to-be-called. A normal ring signal is only applied if the caller delivers the correct password.

In a modification, the invention prevents an ordinary ring signal from being applied to the subscriber's line. That is, if the correct password is not received, the ordinary ring signal is blocked, and the caller is routed to a voice mail system. However, a special signal may be sent to the subscriber. For example, the subscriber may be equipped with a special device, which responds to a special tone transmitted by the telephone switching office. The office transmits the special tone when a call is routed to the voice mail system. The device then illuminates a visible light, indicating to the subscriber that (1) a call has been blocked and (2) a voice mail message has been received.

Alternately, a different type of ring signal may be applied, indicating that a call has been routed to the voice mail system, because of a failed password. The ring signal may be of different voltage, different frequency, different spacing between rings, and so on.

For example, a low-voltage ring signal, at 5 Hz, may be applied. Such a signal will cause an ordinary telephone bell to issue a soft "tap tap tap" at the rate of 5 Hz.

Routing to the voice mail system when a false password is received is not strictly necessary. Callers failing to present the proper password may simply be blocked. In this case, they may be treated as are callers who are blocked by "selective call blocking" service. The caller is informed that the subscriber/target-party is not accepting calls at this time.

The invention can be combined with existing selective-call-acceptance, and selective-call-blocking. In this situation, the telephone switching office maintains two lists for each subscriber subscribing to the services. One list contains a list of telephone numbers from which calls are to be accepted; the other list contains a list of telephone numbers from which calls are to be blocked. In addition, the office maintains a password for each customer selecting the password verification service.

When an incoming call arrives, the office verifies whether the call should be accepted or blocked, using the two lists. If the call is to be accepted, the office verifies whether the correct password has been received, and takes the actions described above.

Of course, various over-rides can be selected. That is, should a caller listed on the "acceptable list" still be reuqired to present a password ? For example, if a caller's number is on the accepted list, then no password may be required. If a caller is on the blocked list, a password may over-ride the blockage.

3. In one form of the invention, only local telephone companies may implement password protection. That is, local telephone service providers have direct access to their customers. Each customer can choose, or change, a password by direct communication with the local company. For example, the company may include a form with the monthly bill, which allows the customer to select a password, by writing the password, and mailing the password to the company. The company would apply password protection to every set of signals it received which call for a ring signal to be issued to a customer's telephone line.

If the existing system is not set up to relay passwords from remote systems, the local company will issue a prompt to the caller, saying, "enter the password now."

Restated, the nationwide switching system routes the call to the local provider of the party-to-be-called. If that provider needs a password, it opens a communication channel with the calling party, and requests a password. If one is received, it evaluates it as described herein. Otherwise, the caller is routed to a voice mail system.

Figure 18:
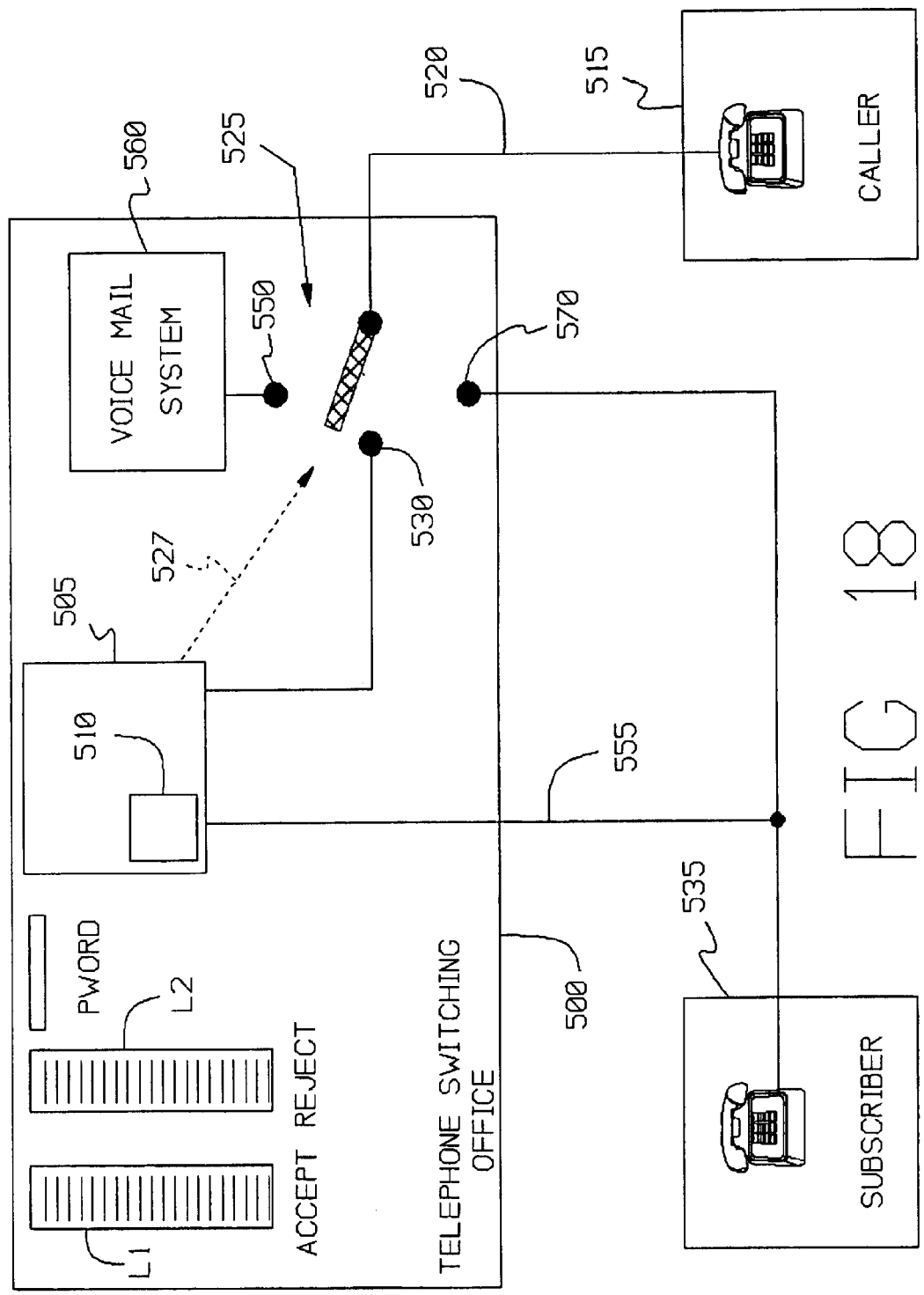

4. FIG. 18 is a schematic view of one form of the invention. A telephone switching office 500 contains computerized equipment and software 505. Added to the equipment 505 is hardware and software 510 which perform the functions utilized by the invention.

When a caller 515 places a call, the caller places a sequence of DTMF signals onto line 520. A conceptual rotary switch 525 is shown, and stands at position 530 at this time. Arrow 527 indicates that the rotary switch 525 is under control of equipment 505. However, only the equipment 505 receives these DTMF signals at this time.

The equipment 505 receives the DTMF signals, and identifies subscriber 535 as the party-to-be-called. The office 500 maintains, for each subscriber requesting any of them, (1) a list L1 of telephone numbers from which calls are to be accepted, (2) a list L2 of telephone numbers from which calls are to be rejected, and (3) a password PWORD.

The equipment 505 inquires whether selective-call-blocking or selective-call-acceptance are active at the time, and, if so, consults the appropriate list L1 or L2, and accepts or blocks the call, as appropriate. In addition, if the call is to be blocked, the equipment 505 may place switch 525 to position 550, thereby routing the call from caller 515 to a voice mail system 560. In this event, a special, non-normal, distinctive ring signal may be delivered to subscriber 535.

If the proper password is submitted by caller 515, either with or without prompting, the equipment 505 issues a ring signal to subscriber 535, on line 555. When the equipment 505 detects that the telephone of subscriber 535 goes off-hook, the equipment 505 moves switch 525 to position 570, thereby connecting the caller 515 to subscriber 535.

5. It may be thought that the invention is shown within the prior art, as when an automated telephone call center prompts a caller to "enter the number of your party's extension now." That number may be thought to act as a password. However, that is not so, for several reasons.

Figure 19:
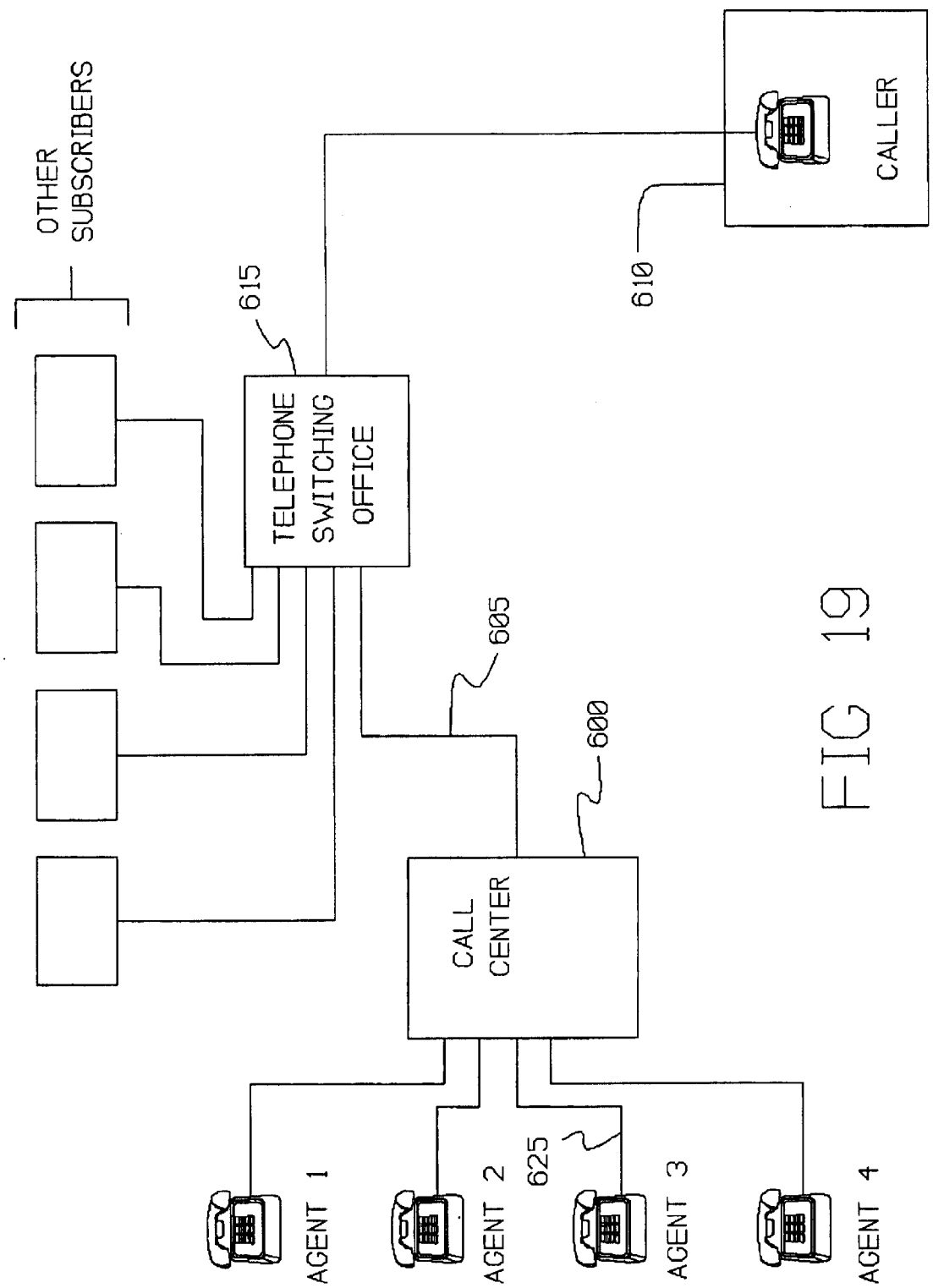

FIG. 19 illustrates an Automated Call Distribution center 600, ACD, also called a call center. When an incoming call arrives, on line 605, from a caller 610, the call center locates an AGENT who is free, and routes the call to that AGENT. In addition, the call center 600 may allow the caller to select the agent, by entering the "extension" of a desired agent, and will connect the caller to that agent.

However, a ring signal, issued by the telephone switching office 615 on line 605, alerted the call center to the call from caller 610. If the invention is used by the switching office 615, the invention looked for a password from caller 610, prior to issuing that ring signal. That is, if the call center 600 were to utilize the password protection of the invention (which is not the case, because the invention is not within the prior art), the switching office 615 would look for that password, in connection with the telephone number which caller 610 transmitted to the office 615. This would be done prior to the application of a ring signal to line 605.

A second factor is that the ring signal on line 605 is the first ring signal involved in setting up communication between the two ultimate parties to the communication. That is, for example, assume that caller 610 dials the call center 600. The office 615 issues a ring signal on line 605. The call center 600 answers, and asks caller 610 for an extension number. Caller 610 provides the extension for AGENT 3. The call center 600 issues a ring signal on line 625, which leads to the telephone of AGENT 3. That is the second ring signal.

The invention evaluates the password prior to issuing the first ring signal, namely, that to the call center 600.

A third factor is that, when the office 615 receives a password, the password, if correct, merely gives authorization to issue a ring signal to a telephone line which is already identified to the office 615. That is, assume that caller 610 transmits the telephone number "1444-5555" to the office 615, and that this number is the telephone number of the call center 600. Caller 610 will follow this number by the password, either with, or without, a prompt from the office 615.

The password only demonstrates authorization by caller to ring the number presented to the office 615, namely, "444-5555." Restated, the office 615 knows in advance what number to ring; the only question answered by the password is whether to ring the number at all.

In contrast, when caller transmits the extension number for AGENT 3, the call center 600 does not know, at that time, which extension will receive the ring signal. The extension number identifies the line, line 625, onto which the center 600 is to apply the ring signal.

Therefore, giving an extension number to a call center does not transmit a password to the call center because the extension number identifies the line to be "rung." A password does not identify a line, and the line to be "rung" is identified by other signals. Further, as stated, under the invention, the password is used to make a determination of whether to apply the first ring signal in an overall transaction. The call center does not generate the first ring signal. Further still, at the time the password is received by the office 615, the line to be "rung" is already identified, by other signals. The fact that the system can be arranged so that the password arrives first is seen as making no difference.

6. The selective-call-acceptance, SCA, offered by many telephone companies offers the following features. A subscriber lifts the handset, and dials a specific code. The telephone company's robot informs the subscriber whether the subscriber's SCA is currently activated. The robot informs the subscriber how to turn SCA on or off.

To add a new number to the list, the subscriber enters a specific code, followed by the number. To hear a list of the numbers on the list, the subscriber enters another code, and so on.

The password of the invention can be activated, deactivated, created for the first time, and changed, in a similar manner.

7. The invention specifically applies to cellular telephones. The invention also applies to normal daily operation of telephones, ot POTS lines, Plain Old Telephone Service.

One form of the invention specifically does not apply to processes in which passwords are used to protect sensitive information. For example, in initializing a newly purchased cellular telephone, passwords are sometimes used. Those passwords are used to protect other, secret, information.

Under one form of the invention, the password itself is the secret information or, more precisely, the association of a particular password with a specific telephone number is the secret information. However, possession of the password does not reveal the associated telephone number, nor vice versa.

8. FIG. 21 illustrates one approach which allows a subscriber to change the subscriber's password. Block 650 indicates that the customer is identified. This can occur, for example, when the customer lifts the handset of the customer's answering machine 3 in FIG. 1. Since line 6 leads to the telephone company's central office, and the telephone company knows which subscriber is assigned to line 6, lifting the handset identifies the customer. Alternately, the customer can enter the customer's telephone number on a keypad.

After the customer is identified, block 652 indicates that a request for modifying the passsword, or setting the password initially, is received. This request can be made by pressing a specific key on the telephone keypad, or by speaking the request, if a voice recognition system is used by the telephone company.

Block 655 indicates that, in response to the request to change, or to set the password, the telephone company's system speaks the existing password, or indicates that no password presently exists. Next, the customer enters the new password, in block 675, as by pressing keys on the telephone keypad.

Block 659 indicates that the telephone company's system speaks the new password. Block 663 indicates that the telephone company's system speaks a request that the customer confirm that the new password should be implemented. If the confirmation is received, the YES path from decision block 665 indicates that block 670 is reached, wherein the new password is implemented.

If the confirmation is NOT received, the NO path from decision block 665 indicates that part of the process is repeated. In the repeated process, certain steps may be omitted, such as step 659. That is, after the password has been changed, block 655, if reached, will speak that password. If the customer does not enter a new password in block 657, then it would be redundant to repeat block 659. If the repetition occurs more than, say, 5 times, because the customer enters no confirmation for block 663, then the procedure terminates, and the customer's old password is used.

9. In one form of the invention, the telephone company informs certain parties of the new password. For example, the subscriber's telephone company receives passwords when parties attempt to call the subscriber. If the password is correct, the telephone company transmits a ring signal to the subscriber.

The telephone company can retain a record of all those parties. For example, if the parties use the telephone company as their telephone service provider, the telephone company knows who they are. In the case of other providers, the telephone company can identify them, using "CALLER ID" services. Therefore, the subscriber's telephone company maintains records of (1) all parties calling the subscriber and who (2) presented a valid password.

When the subscriber changes the password, as in FIG. 21, the telephone company inquires whether the subscriber wishes the telephone company to inform the callers holding passwords of the new password. If the subscriber says YES, the telephone company does so, as by calling each party, and leaving a message which identifies the subscriber and the new password. The message may be left with either a human, or an answering machine.

If the telephone company fails to reach any of the parties, that is, the party's telephone is not answered in response to the attempt to leave the message, after, say, five attempts or two days, whichever occurs first, the telephone company presents a list of parties to the subscriber, identifying the parties who were not informed. The list may identify all parties, and indicate which were informed, and which were not informed.

The usefulness of this procedure does not depend on successful contact being made with all parties holding passwords. If even one party is contacted, even after several changes in the password, that contact saves the subscriber the effort of contacting that party.

Additional Considerations

1. In one form of the invention, the password examination applies only to POTS telephones.

2. A clearly different situation should be identified. When a customer terminates telephone service with a telephone company, or has failed to pay a bill for past service, the telephone company may block calls to that customer. That is, the customer in question may be identified on a list, and the computerized equipment at the telephone company may examine that list every time a call is to be placed, to any customer. If the customer is found on the list, the call is blocked.

That is not password protection. One reason is that the caller provided no password.

Third Embodiment

FIG. 20 illustrates one form of the invention. In brief, the apparatus of FIG. 1 are consolitated into a single unit. An answering machine 700 in FIG. 20 is shown, having the normal operating characteristics of such a machine. It contains a recorded message, it goes off-hook when a ring signal is detected, it plays the message, and it accepts a message for recording from a caller. In addition, it contains an annunciator 25 which announces the arrival of the ring signal, the annunciator can be de-activated by delivering an appropriate signal to control circuitry 701, and the machine 700 may play the incoming message over a speaker (not shown). The annunciator 25 may act as the speaker.

The answering machine 700 is contained within a common housing 715 as apparatus 9A, which is shown in FIGS. 1 and 11. Three modifications, or additions, to the answering machine 700 are undertaken. One, a switch 720 transfers control of the annunciator 25 between a control circuit 701 and the accessory 9A. Thus, the control circuitry 701 either actuates the annunciator 25 when a ring signal arrives on line 6, or apparatus 9A actuates the annunciator, when a password arrives on line 6. In the latter case, the ring signal does not actuate the annunciator 25.

A second modification is that a tap 706 into hook switch 705 is provided. The tap delivers a signal on line 710 to the accessory 9A. Accessory 9A utilizes the signal to ascertain when the handset 50 is lifted. At that time, the processor 20 (not shown in FIG. 20) terminates the sounding of annunciator 25. Thus, when the handset 50 is lifted, the annunciator 25 becomes silent.

The third modification is that a tap 725 to telephone line 6 is provided. The tap 72 allows accessory 9A to listen to the line 6, to detect the incoming password.

Numerous substitutions and modifications can be undertaken without departing from the true spirit and scope of the invention. What is desired to be secured by Letters Patent is the invention as defined in the following claims.

What is claimed is:

1. An accessory for a telephonic device, comprising:
   a) tap means for tapping into a telephone line used by the telephonic device;
   b) an annunciator;
   c) memory means for storing a password; and
   d) detection means for
      i) detecting DTMF signals on the tap, and
      ii) ascertaining whether the DTMF signals match the password and, if so, causing the annunciator to sound,
   wherein connection of the telephonic device with the telephone line is not disrupted during operation of the accessory.

2. The accessory according to claim 1, wherein the telephonic device comprises a telephone answering machine, and the accessory and the answering machine share a common housing.

3. The accessory according to claim 1, wherein
   1) the telephonic device comprises an answering machine contains recording apparatus for recording an incoming call and,
   2) the accessory is effective to cause the annunciator to sound if DTMF signals matching a stored password are received after said recording begins.

4. The accessory according to claim 1, wherein the accessory is effective to cause the annunciator to sound whenever DTMF signals matching a stored password are received from the telephonic device.

5. The accessory according to claim 1, wherein the accessory is effective to cause the annunciator to sound if DTMF signals matching a stored password are received from the telephonic device, and no ring signal is received by the accessory.

6. A method of utilizing a telephone answering machine, comprising the following steps:
   a) preventing the answering machine from issuing its normal ring sound when ring signals arrive on its telephone line, but without disconnecting the answering machine from the telephone line;
   b) maintaining a detector, tapped into the telephone line, which:
      i) stores a password;

ii) detects DTMF signals on the telephone line;
iii) ascertains whether the DTMF signals form a sequence which matches the password and,
A) if so, issuing an acoustic signal, and
B) if not, remaining silent, and
c) recording messages by callers, using the answering machine.

7. The method according to claim 6, and further comprising the step of, after beginning to record a message from a caller, ascertaining whether DTMF signals are received which match the password and, if so, issuing an acoustic signal.

8. The method according to claim 6, and further comprising
d) detecting DTMF signals on the telephone line produced by the answering machine;
e) ascertaining whether the DTMF signals form a sequence which matches the password and, if so, issuing an acoustic signal whenever such DTMF signals are received.

9. An apparatus, comprising:
a) a tap for tapping into a telephone line used by a telephone device, without disconnecting or interrupting the telephone line;
b) a DTMF decoder, connected to the tap, which
i) receives DTMF signals on the telephone line,
ii) decodes each DTMF signals into a multi-bit binary word, and
iii) places the binary word onto a bus;
c) memory for storing a password;
d) an annunciator for making noise;
e) a processor, connected to the memory and to the bus;
f) program means, for running on the processor, which
i) detects a predetermined initialization sequence of one, or more, binary words on the bus;
ii) compares subsequent binary words on the bus with the password and,
A) if a match is found, actuating the annunciator, and
B) if no match is found, not actuating the annunciator.

10. The apparatus according to claim 9, wherein the memory comprises rotary DIP switches, each of which delivers a binary word, and which can be set by a user, to collectively define the password.

11. The apparatus according to claim 10, wherein the predetermined initialization sequence is stored in the memory.

12. The apparatus according to claim 11, wherein the predetermined initialization sequence is stored as binary words by the rotary switches.

13. The apparatus according to claim 9, wherein the telephonic device comprises a telephone answering machine, and the apparatus and the answering machine share a common housing.

14. The apparatus according to claim 13, wherein
1) the telephone answering machine contains recording apparatus for recording an incoming call and,
2) the apparatus is effective to cause the annunciator to sound if DTMF signals matching a stored password are received after said recording begins.

15. The apparatus according to claim 9, wherein
i) the telephone line originates at a telephone company office, and extends past the apparatus to a telephone answering machine, and
ii) the apparatus is effective to actuate the annunciator whenever DTMF signals originating at the answering machine produce binary words which match a password.

16. An accessory for a pre-existing telephone answering machine, consisting essentially of:
a) means for tapping into a telephone line which delivers incoming telephone calls to the answering machine, without interfering with incoming calls or incoming ring signals;
b) an annunciator;
c) one or more passwords stored within the accessory; and
d) circuit means for receiving incoming DTMF signals and, if the DTMF signals match a password, actuating the annunciator.

17. The accessory according to claim 16, wherein the telephone answering machine contains a ringer and,
1) if a user actuates the ringer, then incoming ring signals from a telephone company's office cause the ringer to sound, but
2) if a user de-actuates the ringer, then incoming ring signals from a telephone company's office do not cause the ringer to sound.

18. The accessory according to claim 16, wherein
1) the telephone answering machine contains recording apparatus for recording an incoming call and,
2) the accessory is effective to cause the annunciator to sound if DTMF signals matching a stored password are received after said recording begins.

19. The accessory according to claim 16, wherein the circuit means actuates the annunciator if DTMF signals matching a password are placed on the telephone line by the answering machine.

* * * * *